US011380178B2

(12) United States Patent
Lee et al.

(10) Patent No.: US 11,380,178 B2
(45) Date of Patent: Jul. 5, 2022

(54) PHOTOELECTRIC SMOKE DETECTOR HAVING DOUBLE-BULKHEAD DARKROOM STRUCTURE

(71) Applicant: Byung Kwon Lee, Seoul (KR)

(72) Inventors: Byung Kwon Lee, Seoul (KR); Hong Sun Yu, Gyeonggi-do (KR)

(73) Assignee: Byung Kwon Lee, Seoul (KR)

( * ) Notice: Subject to any disclaimer, the term of this patent is extended or adjusted under 35 U.S.C. 154(b) by 493 days.

(21) Appl. No.: 16/336,548

(22) PCT Filed: Nov. 11, 2016

(86) PCT No.: PCT/KR2016/012967
§ 371 (c)(1),
(2) Date: Apr. 27, 2019

(87) PCT Pub. No.: WO2018/056502
PCT Pub. Date: Mar. 29, 2018

(65) Prior Publication Data
US 2020/0388127 A1 Dec. 10, 2020

(30) Foreign Application Priority Data
Sep. 26, 2016 (KR) .................. 10-2016-0123097

(51) Int. Cl.
*G08B 17/107* (2006.01)
*G08B 17/113* (2006.01)
*G01N 21/53* (2006.01)

(52) U.S. Cl.
CPC ......... *G08B 17/107* (2013.01); *G01N 21/532* (2013.01)

(58) Field of Classification Search
None
See application file for complete search history.

(56) References Cited

U.S. PATENT DOCUMENTS

| | | | | |
|---|---|---|---|---|
| 2002/0084907 A1* | 7/2002 | Rattman | .............. | G08B 17/113 340/630 |
| 2012/0262714 A1* | 10/2012 | Gonzales | ............... | G01N 21/53 356/338 |
| 2017/0213434 A1* | 7/2017 | Bressanutti | ............ | G01N 21/53 |

FOREIGN PATENT DOCUMENTS

| | | |
|---|---|---|
| KR | 1020000064238 | 11/2000 |
| KR | 1020070119593 | 12/2007 |

(Continued)

OTHER PUBLICATIONS

International Search Report dated Feb. 27, 2017 in connection with PCT/KR2016/012967.

(Continued)

*Primary Examiner* — John F Mortell
(74) *Attorney, Agent, or Firm* — Akerman LLP

(57) ABSTRACT

The present invention relates to a photoelectric smoke detector having a double-bulkhead darkroom structure and, more particularly, to a photoelectric smoke detector having a double-bulkhead darkroom structure, comprising: a base having, on one side thereof, a light emitting element receiving part in which a light emitting element for irradiating light to the inside thereof is mounted and, on the other side thereof, a light receiving element part in which a light element for receiving scattered light generated by smoke particles from the light irradiated by the light emitting element is mounted; an outer bulkhead which protrudes toward a lower side of the base to form an outer wall of the smoke detector and in which a smoke inlet having a specific height is formed in a circumferential direction; a lower end surface coupled to a lower end of the outer bulkhead; and an inner bulkhead which protrudes from the lower end surface to an upper side, is disposed to be spaced apart from the outer bulkhead at a specific interval, and is formed to have a height smaller than the height of the outer bulkhead so as (Continued)

to form a gas flow area in an upper portion thereof, wherein smoke flows in through the smoke inlet and passes through a space between the outer bulkhead and the inner bulkhead, and the gas flow area.

5 Claims, 31 Drawing Sheets

(56) References Cited

FOREIGN PATENT DOCUMENTS

| KR | 100891722 | 3/2009 |
| KR | 100892662 | 4/2009 |
| KR | 1020150002299 | 1/2015 |

OTHER PUBLICATIONS

Written Opinion of the International Search Authority dated Feb. 27, 2017 in connection with PCT/KR2016/012967, 7 pages.

\* cited by examiner

[FIG. 1]
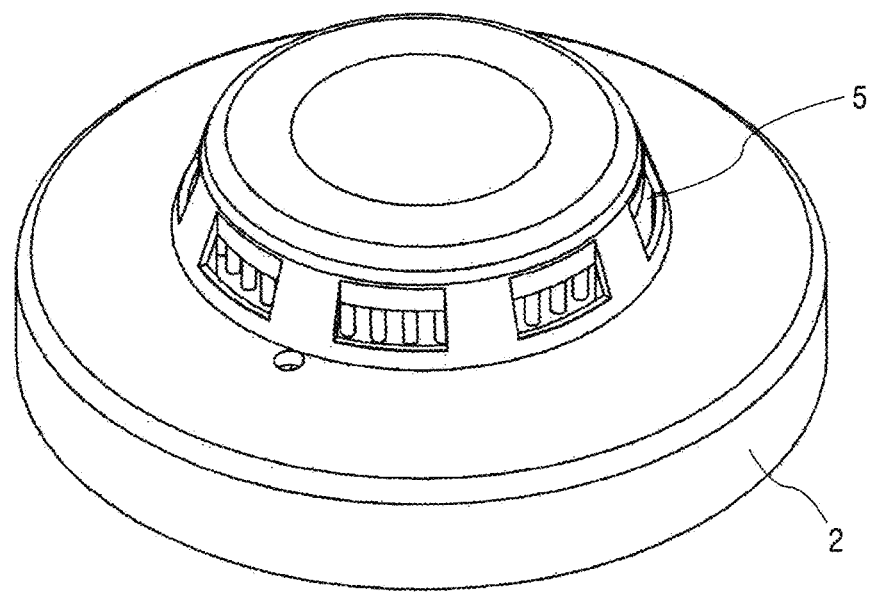
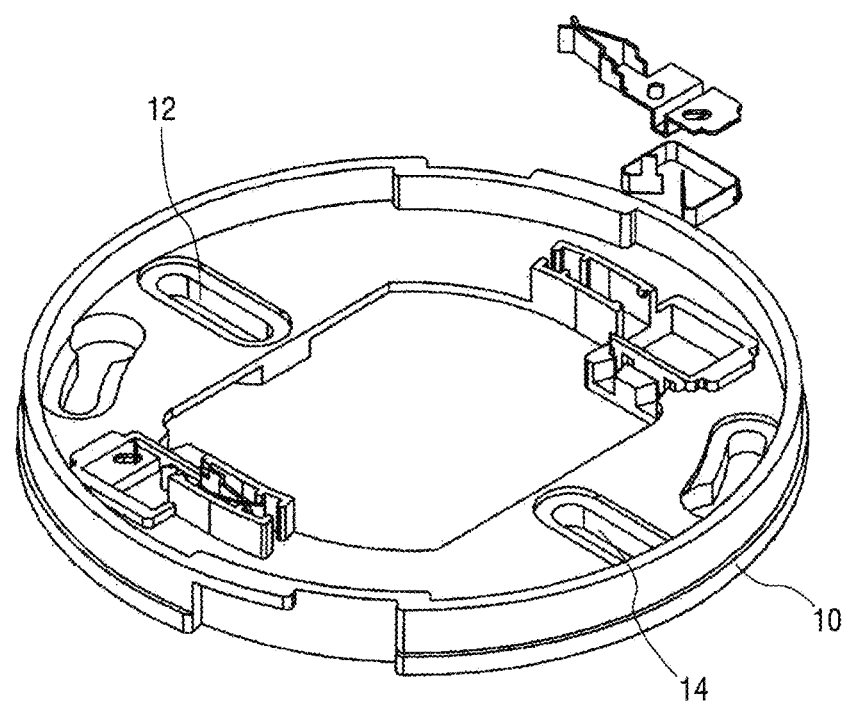

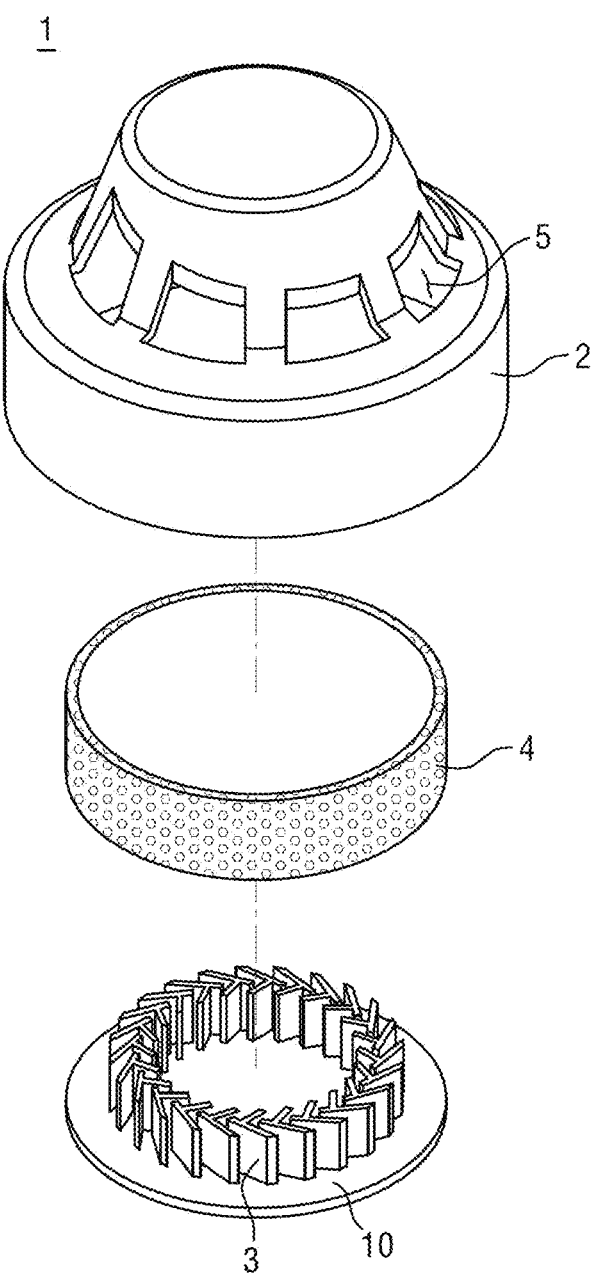
[FIG. 2]

[FIG. 3]
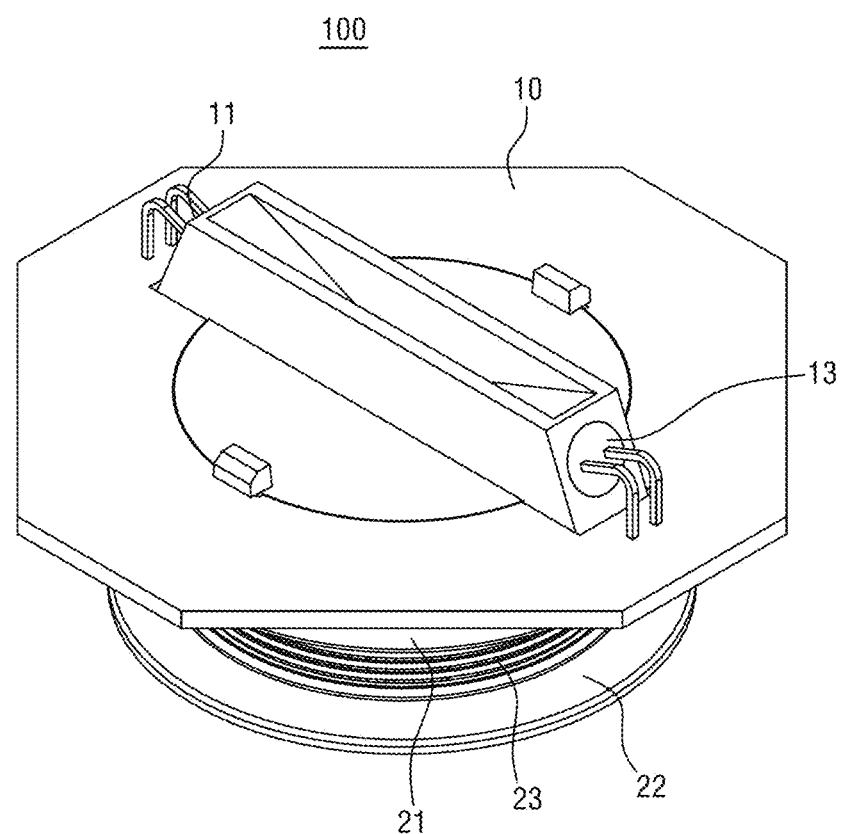

[FIG. 4]
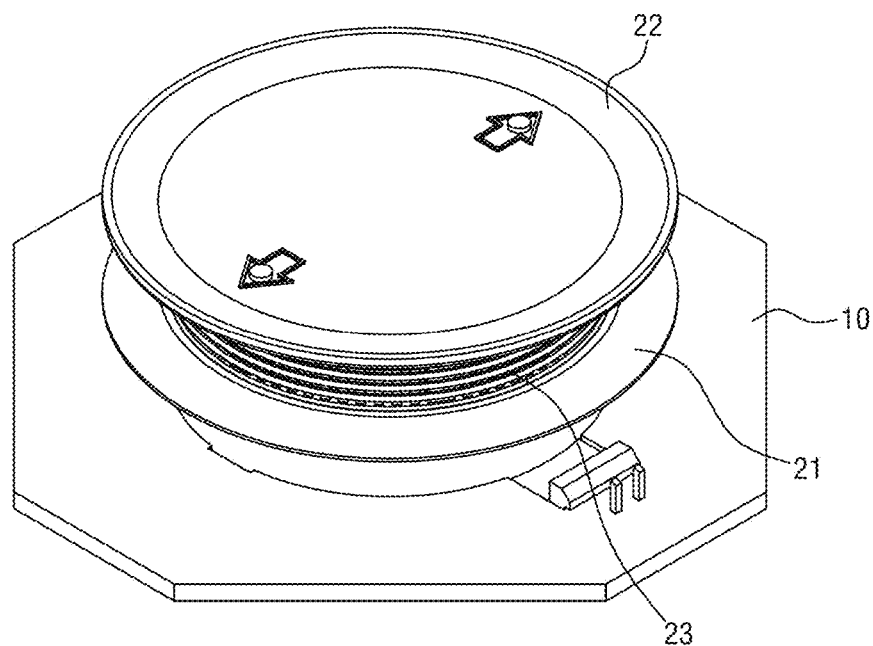
[FIG. 5]
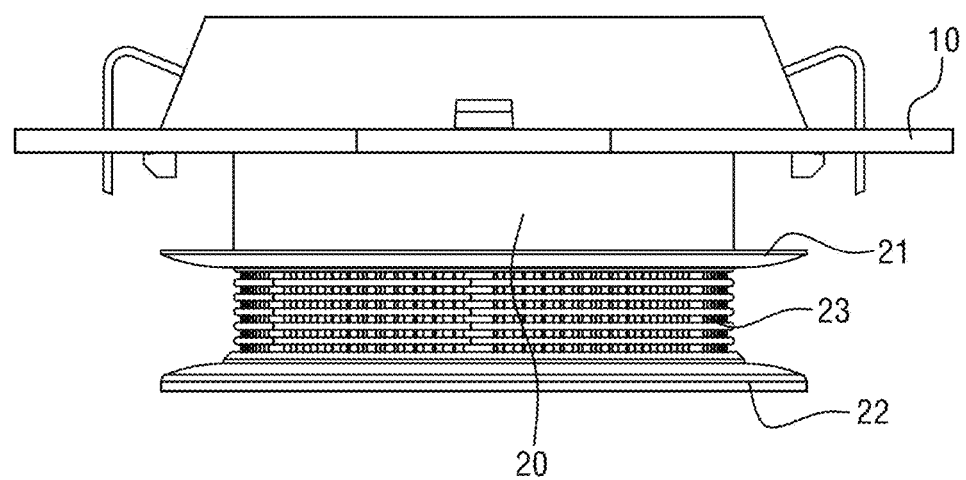

[FIG. 6]
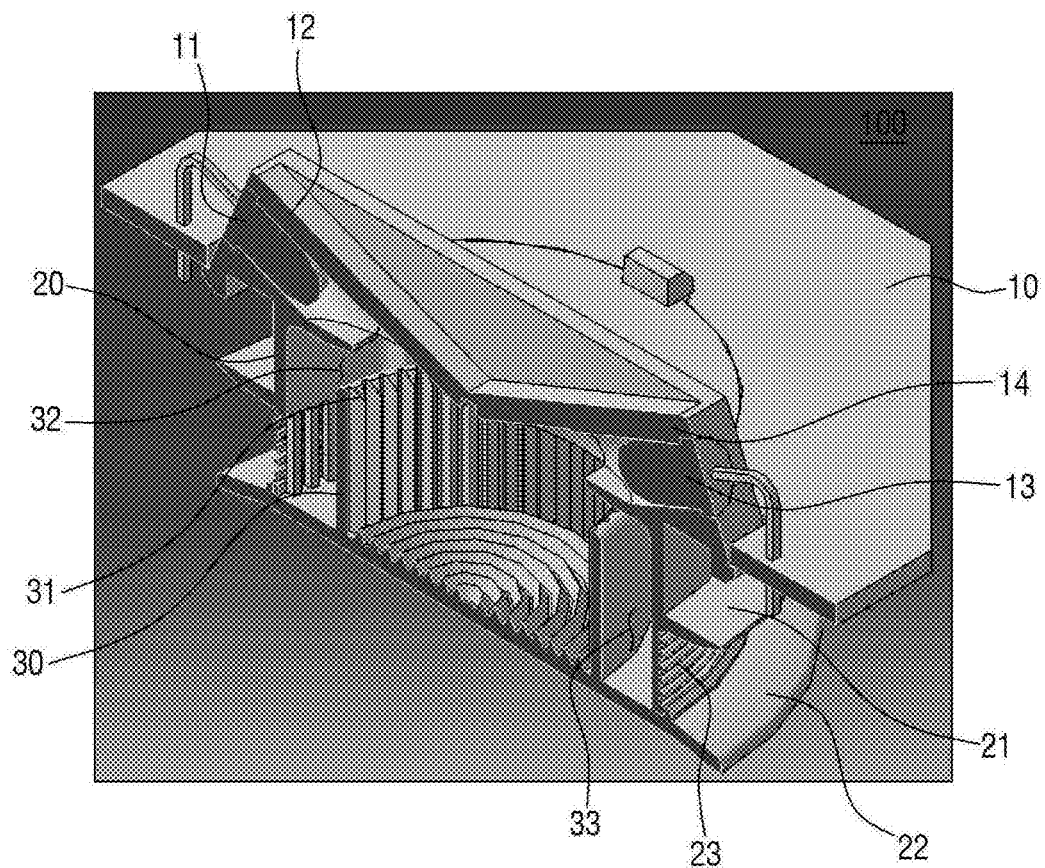

[FIG. 7]
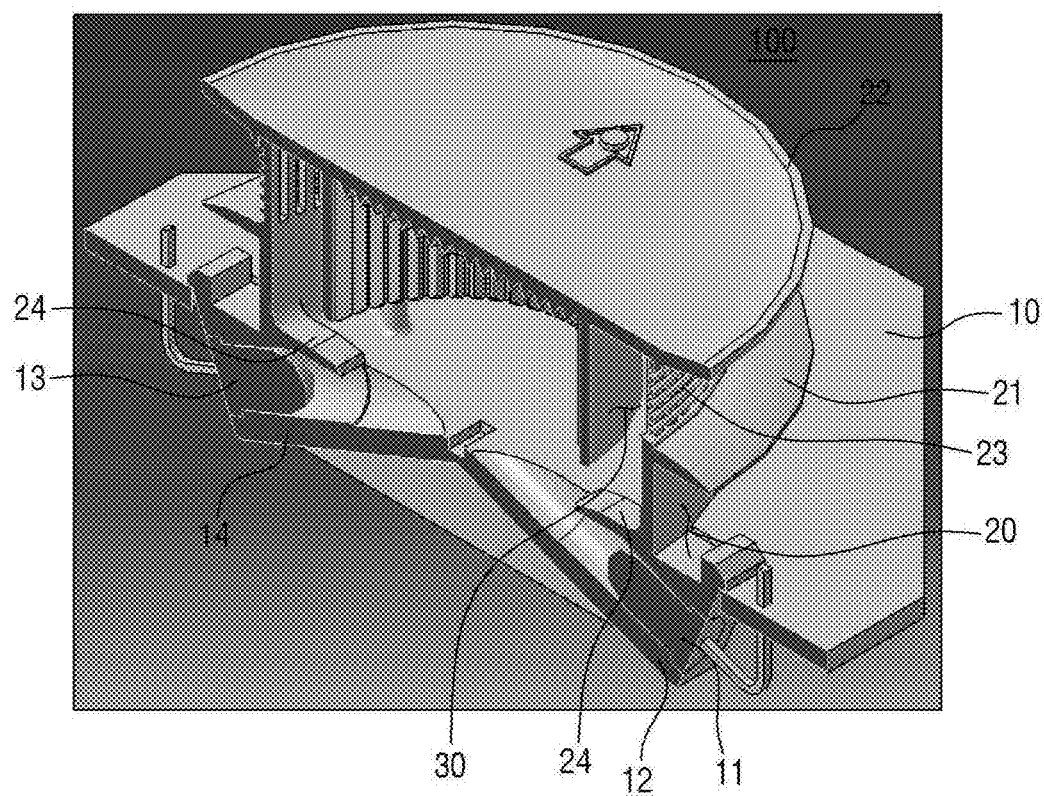

[FIG. 8]
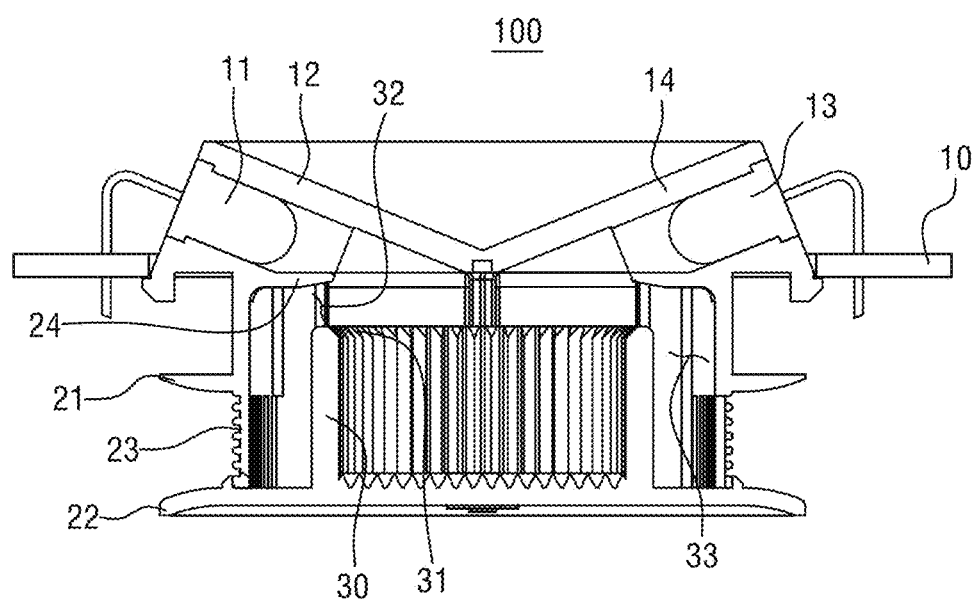

[FIG. 9]
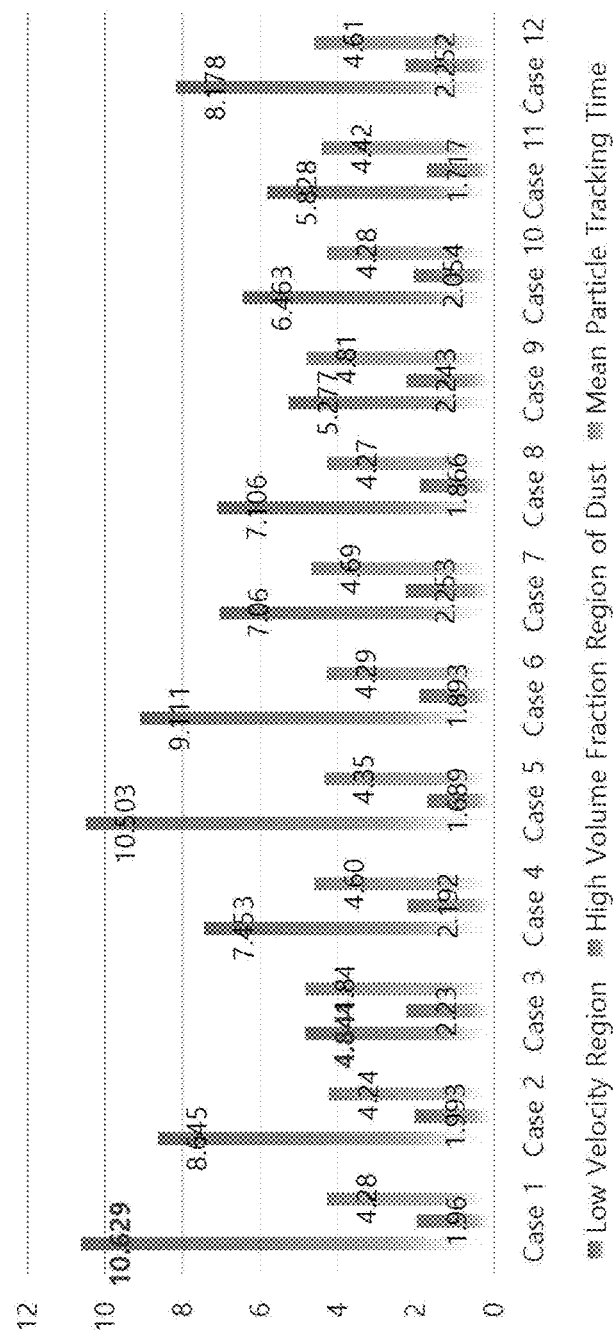

[FIG. 10A]
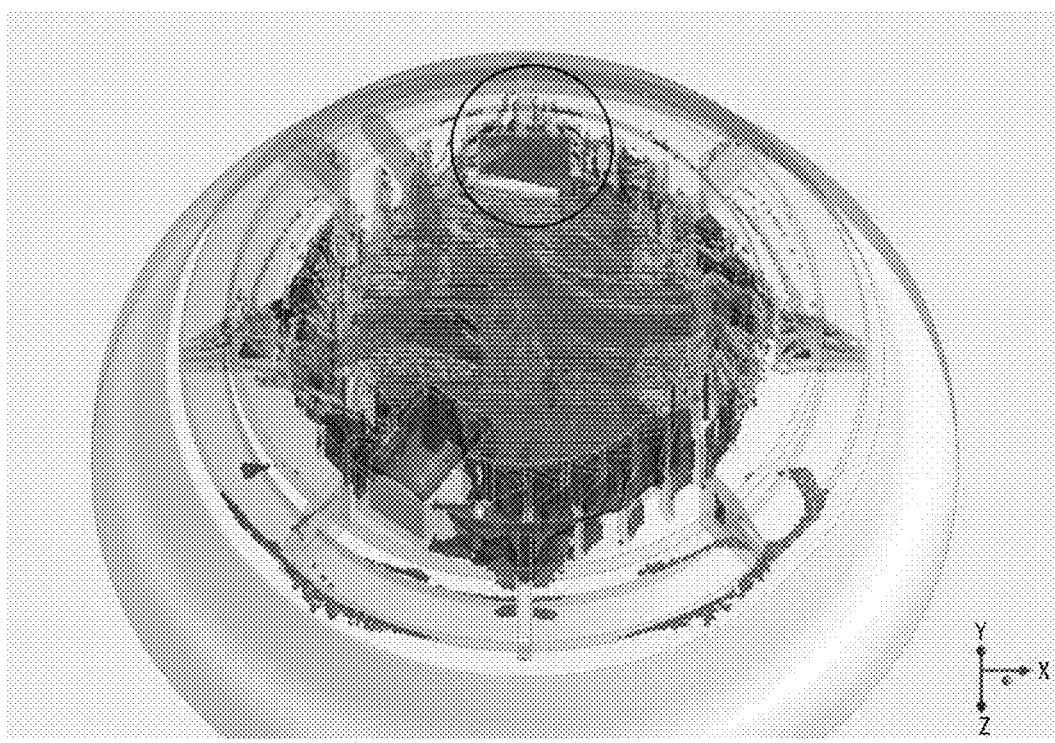

[FIG. 10B]
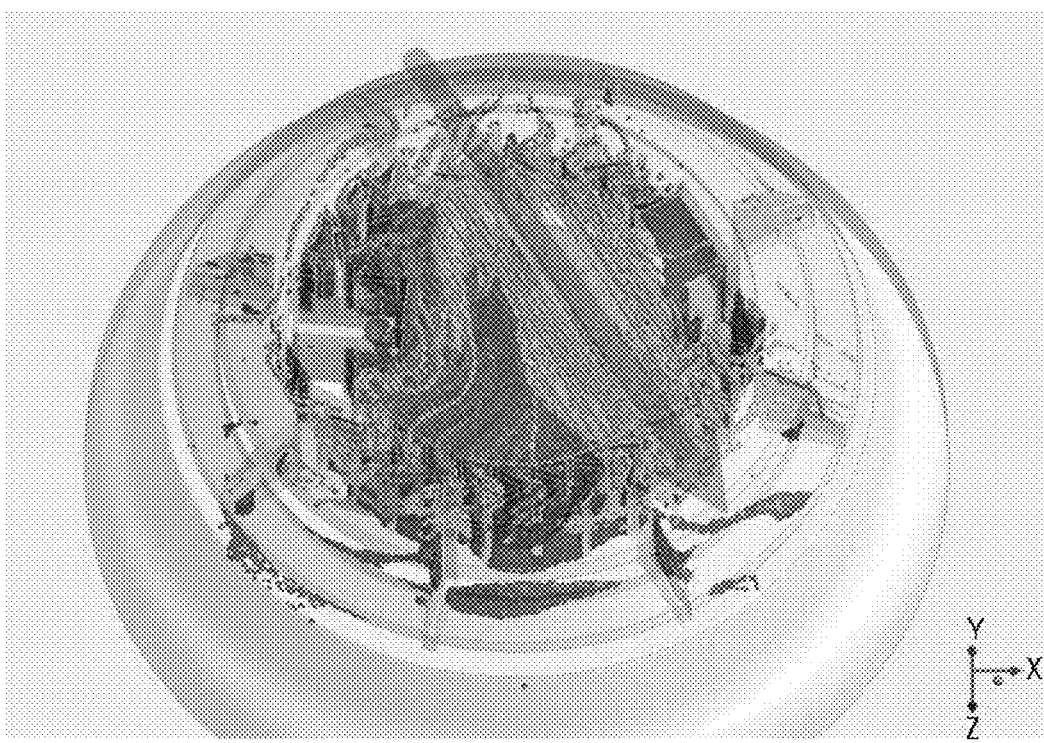

[FIG. 11A]
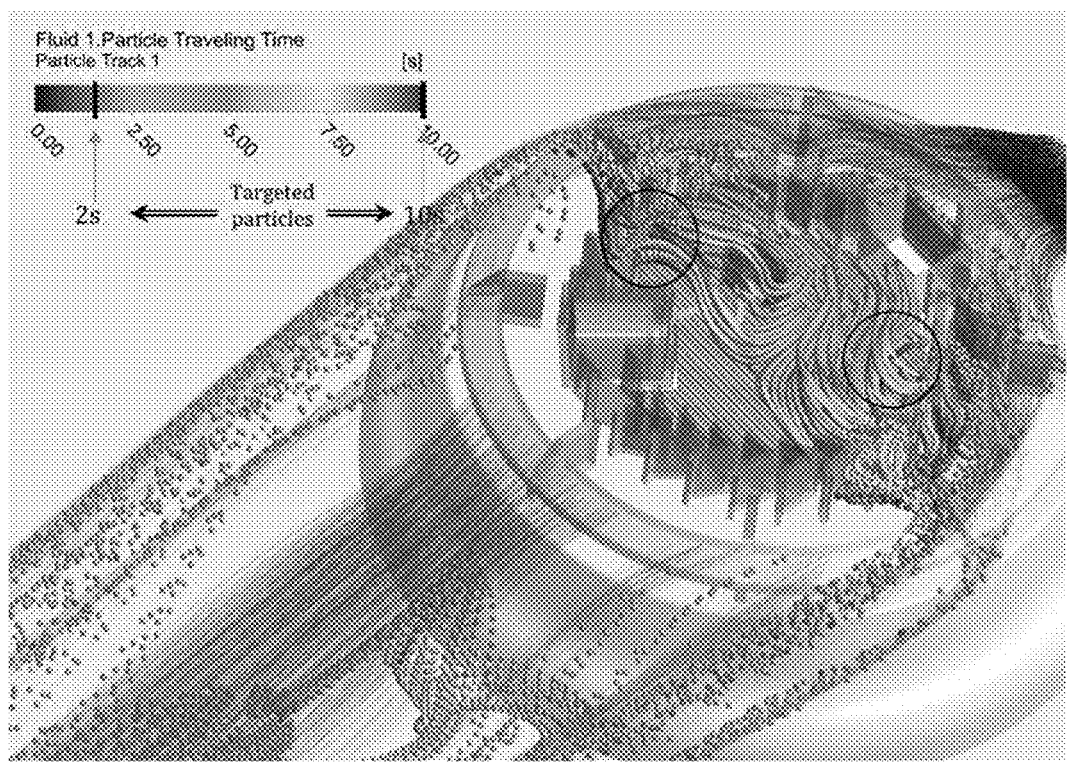

[FIG. 11B]
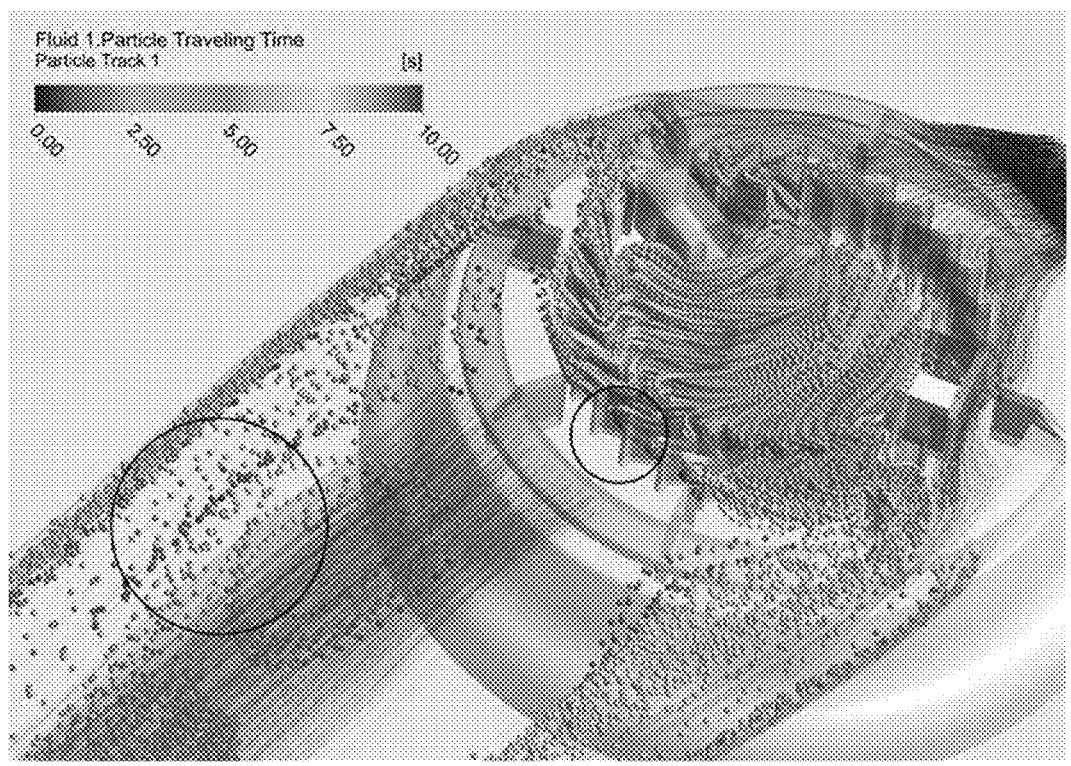

[FIG. 12]
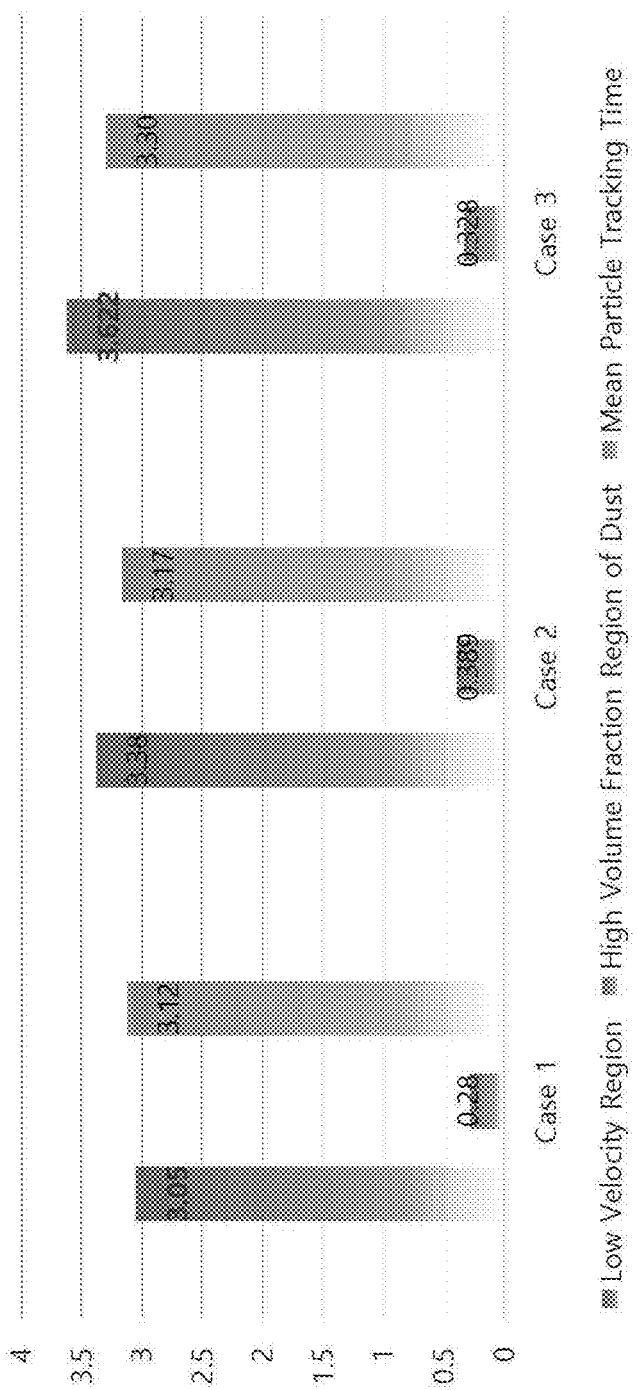

[FIG. 13A]
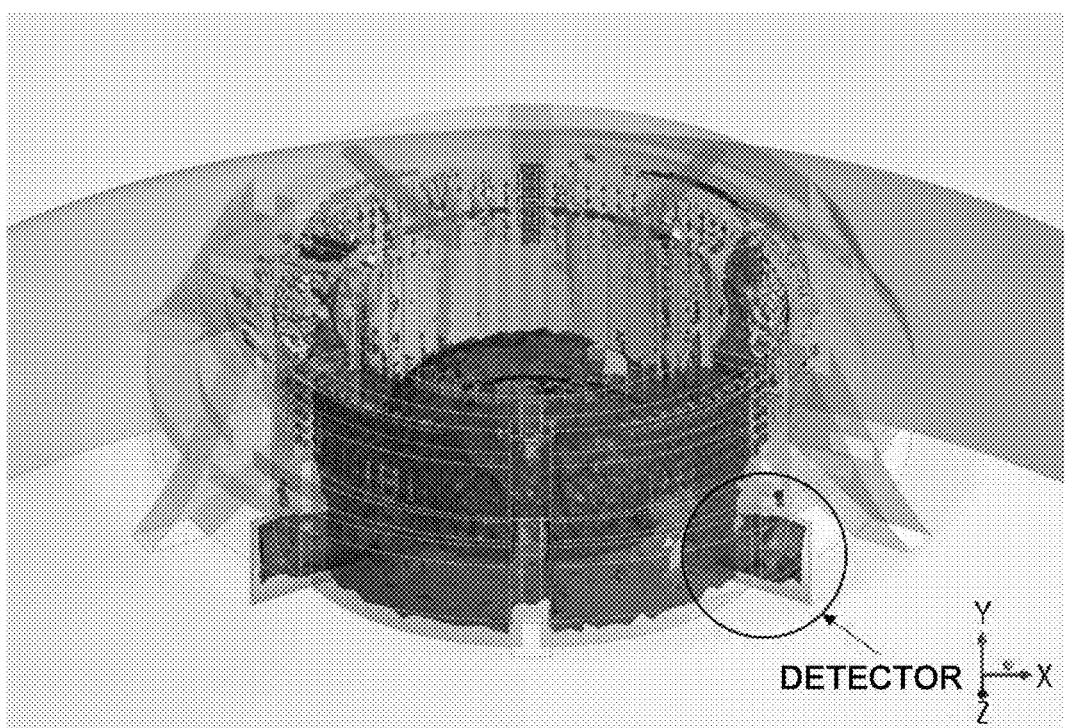

[FIG. 13B]
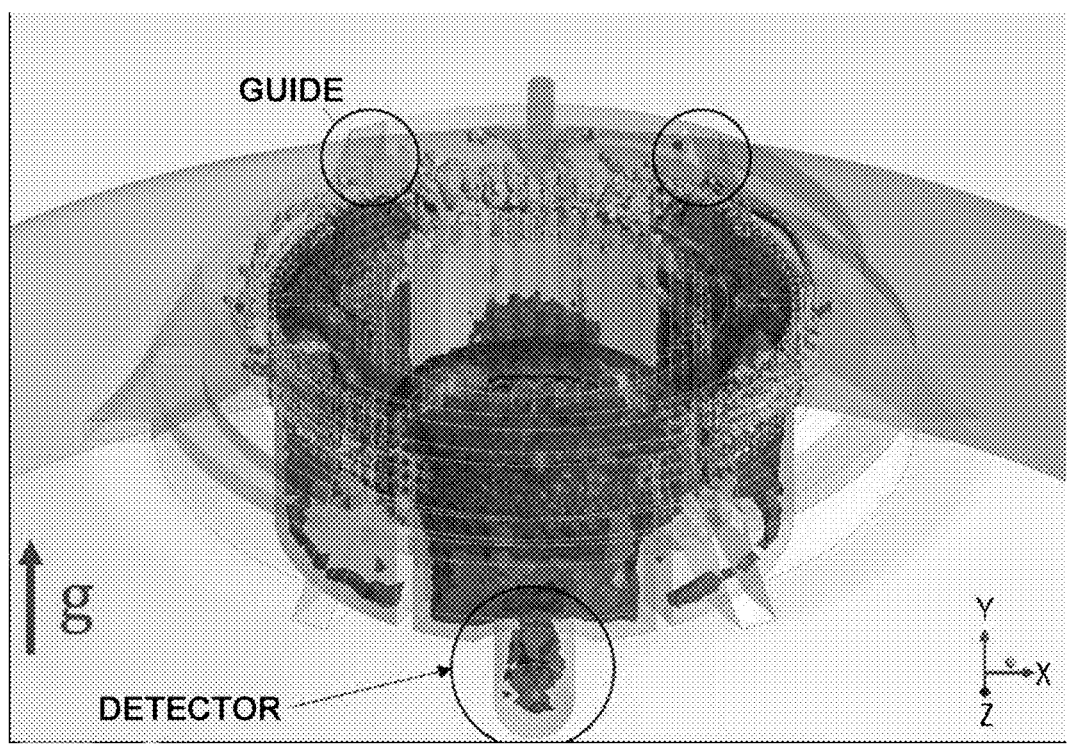

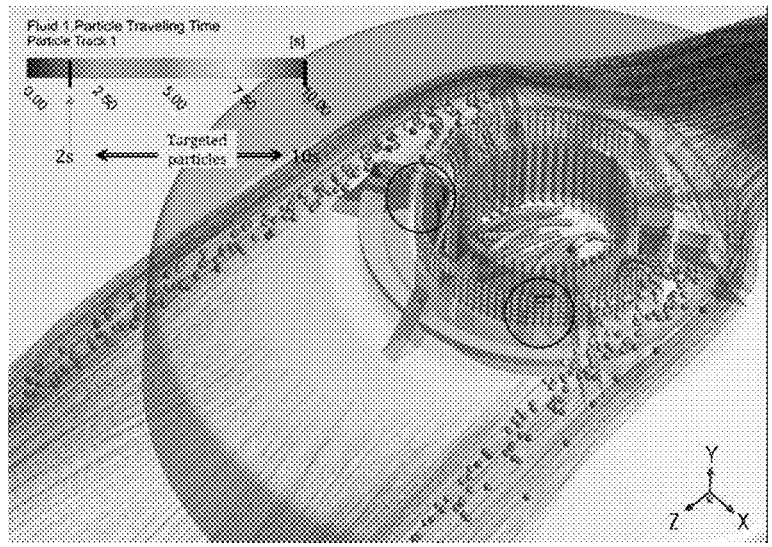
[FIG. 14A]
[FIG. 14B]

[FIG. 15]
|  | LOW FLOW VELOCITY REGION [cm$^3$] | HIGH-CONCENTRATION PARTICLE DISTRIBUTION REGION [cm$^3$] | AVERAGE PARTICLE TRACKING TIME [s] |
|---|---|---|---|
| WEDGE STRUCTURE | 1.89 | 0.21 | 0.22 |
| DOUBLE-BULKHEAD STRUCTURE | 0.29 | 0.03 | 0.06 |
[FIG. 16]
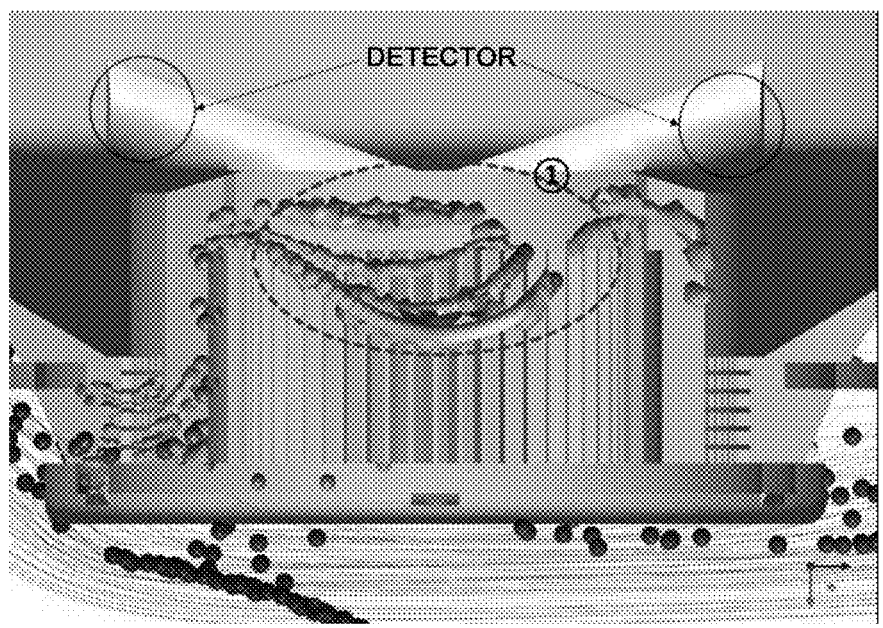

[FIG. 17A]
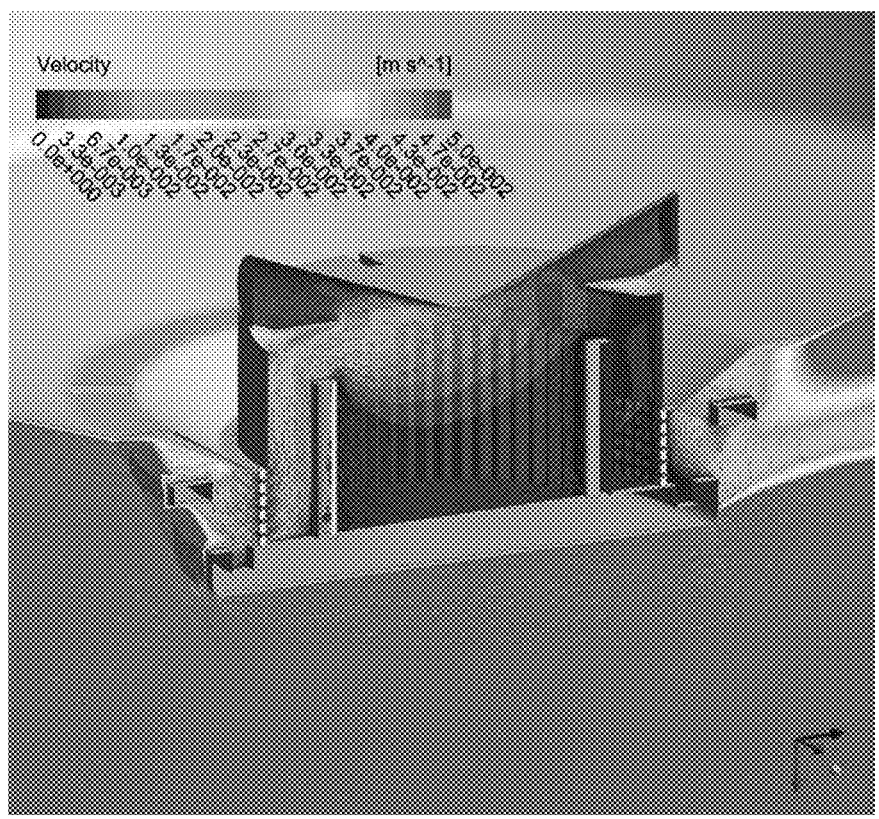

[FIG. 17B]
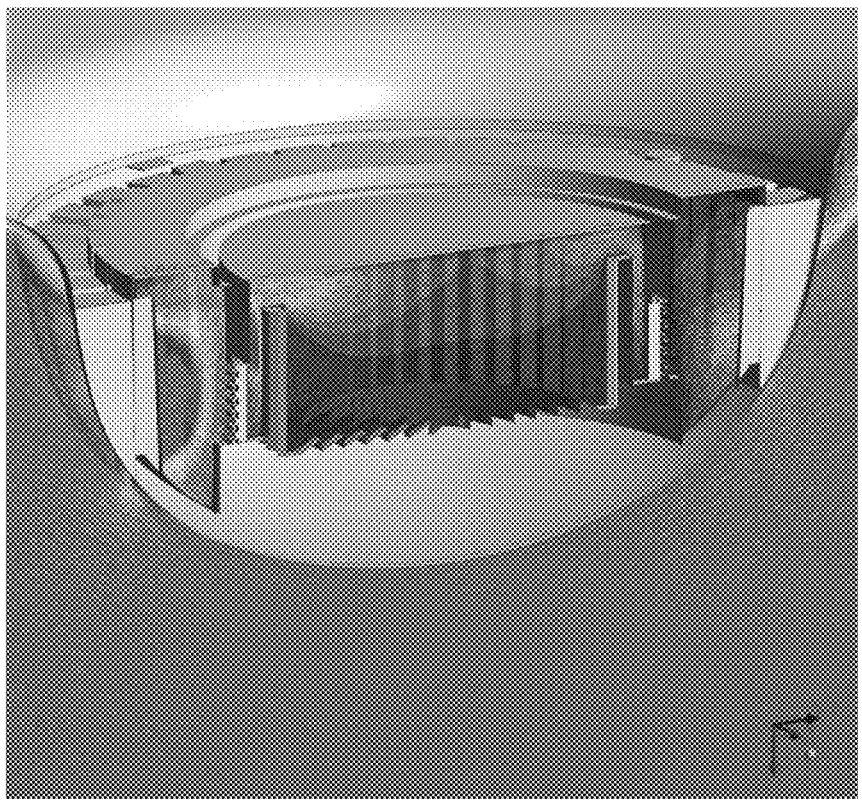

[FIG. 18]
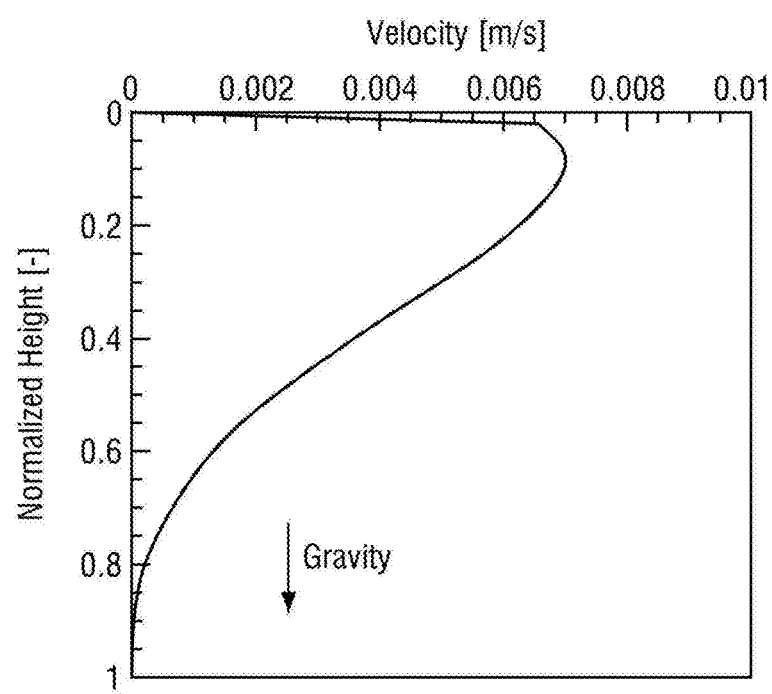

[FIG. 19]
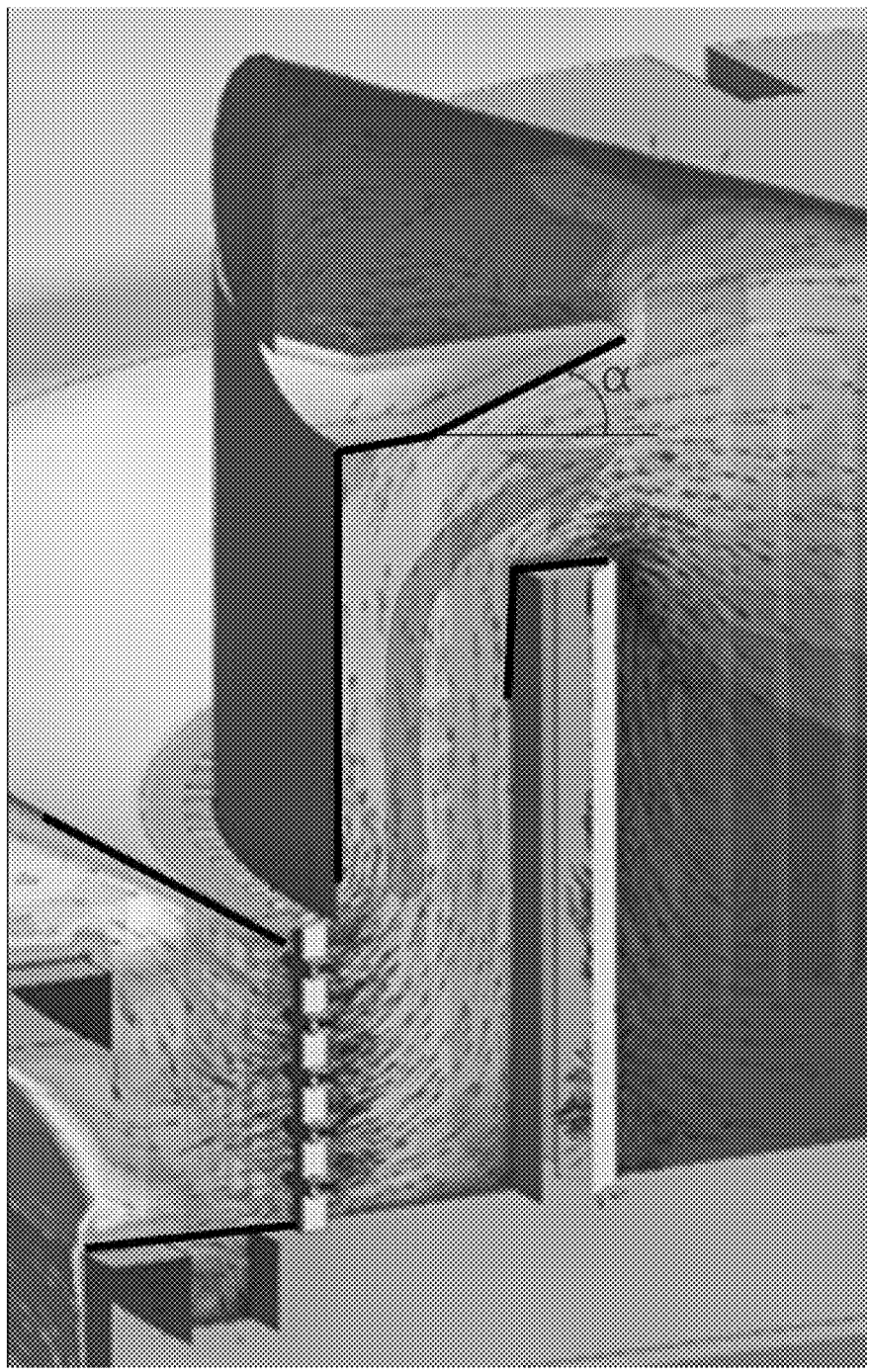

[FIG. 20]
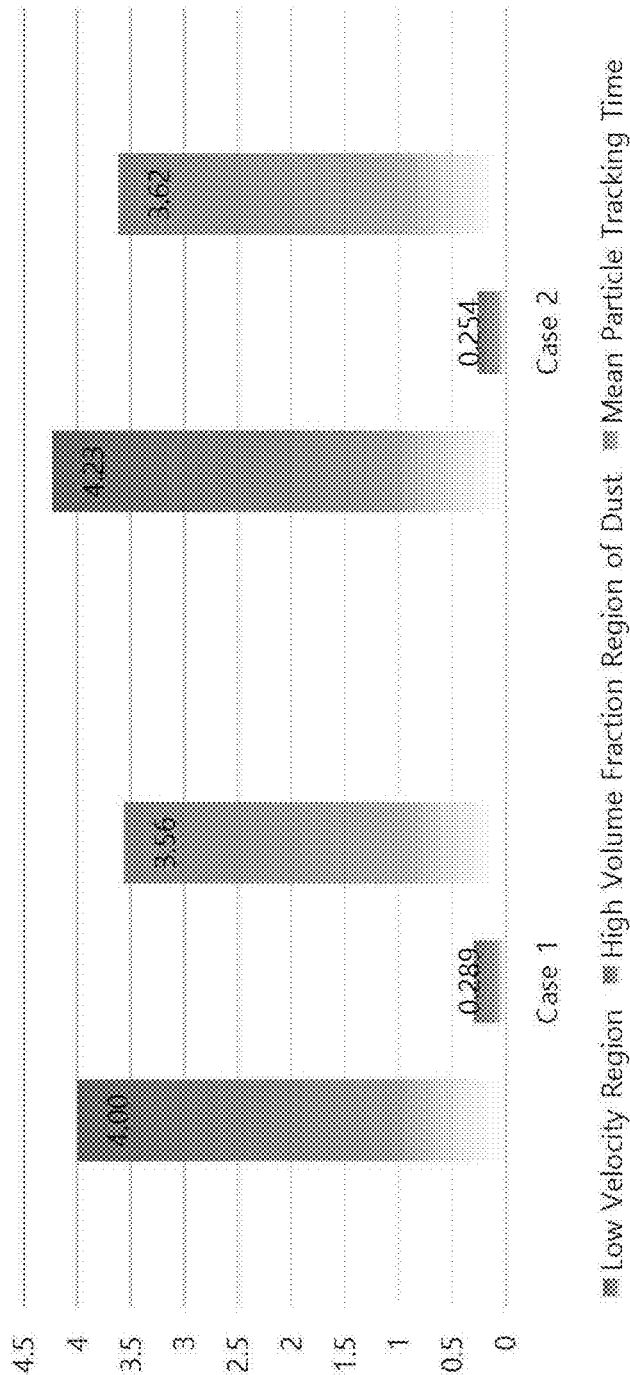

[FIG. 21A]
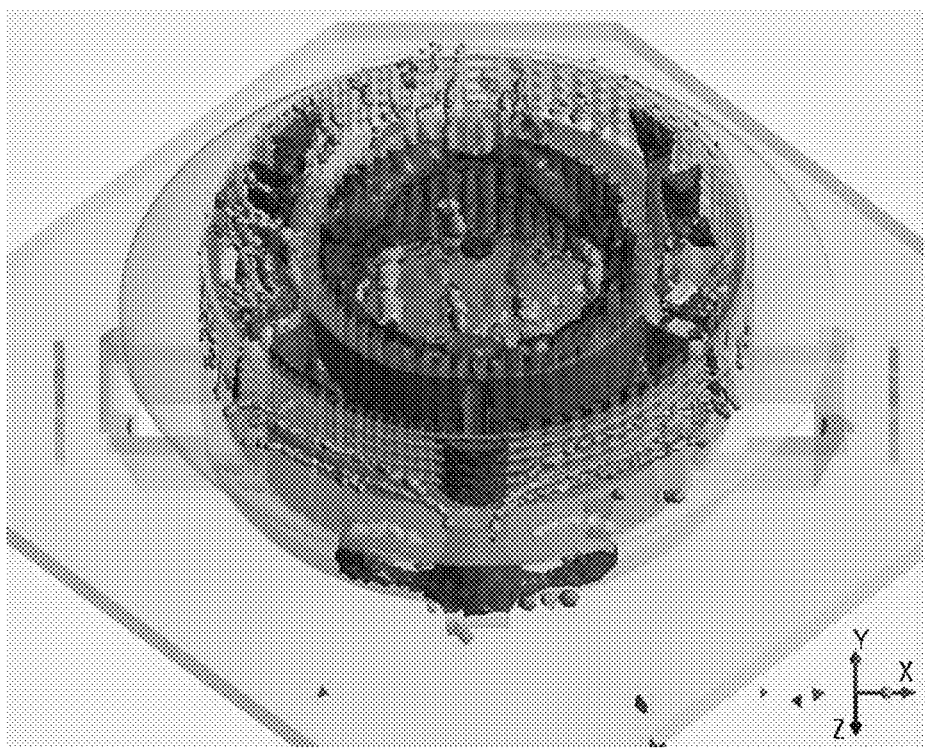

[FIG. 21B]
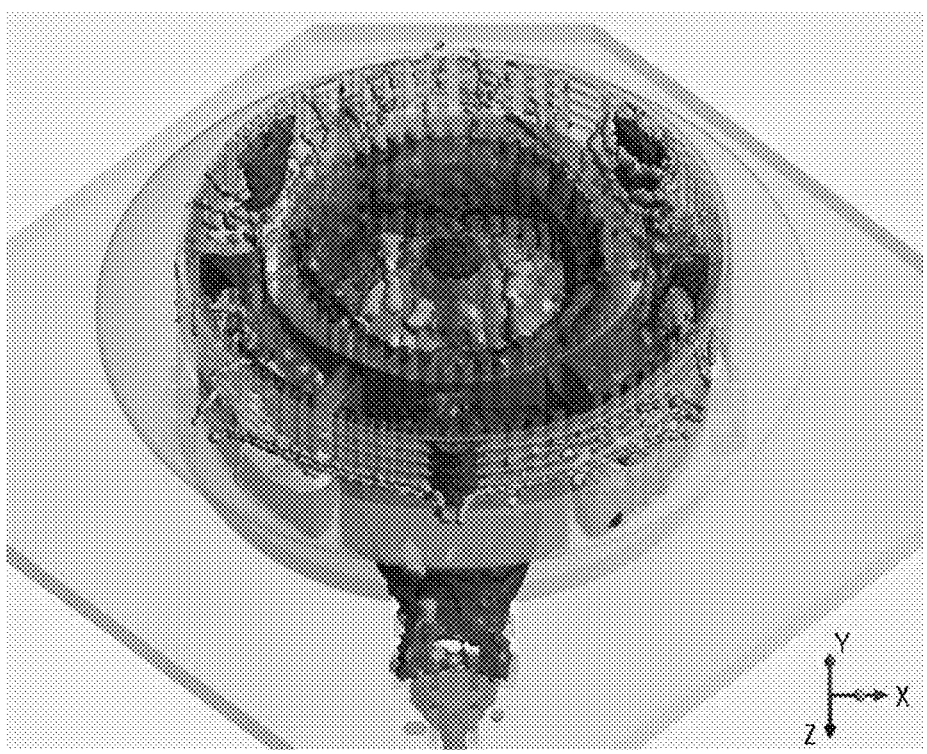

[FIG. 22A]
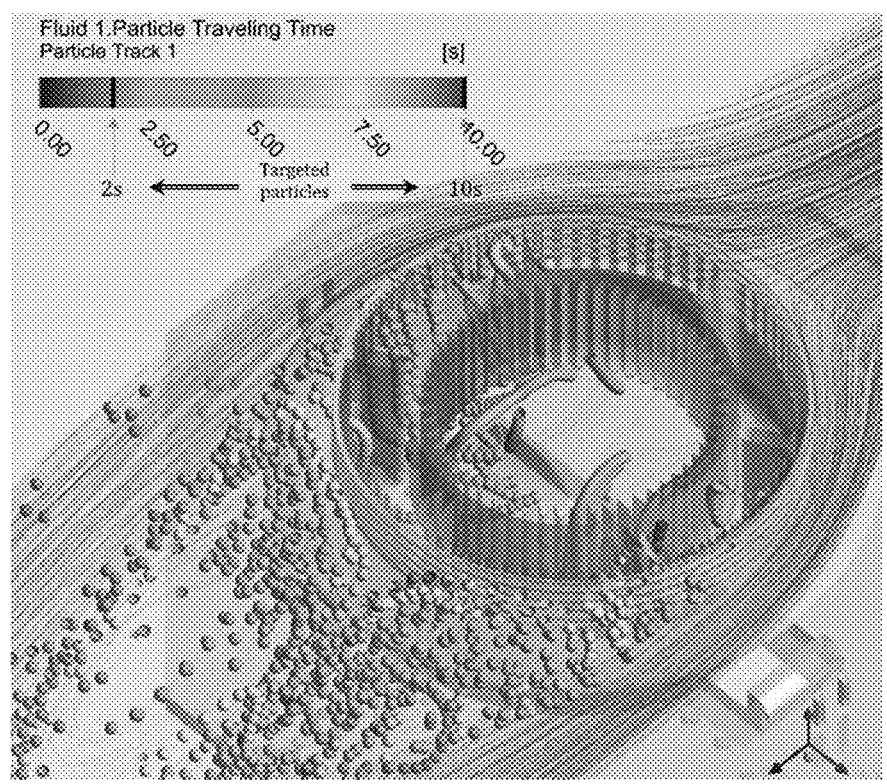

[FIG. 22B]
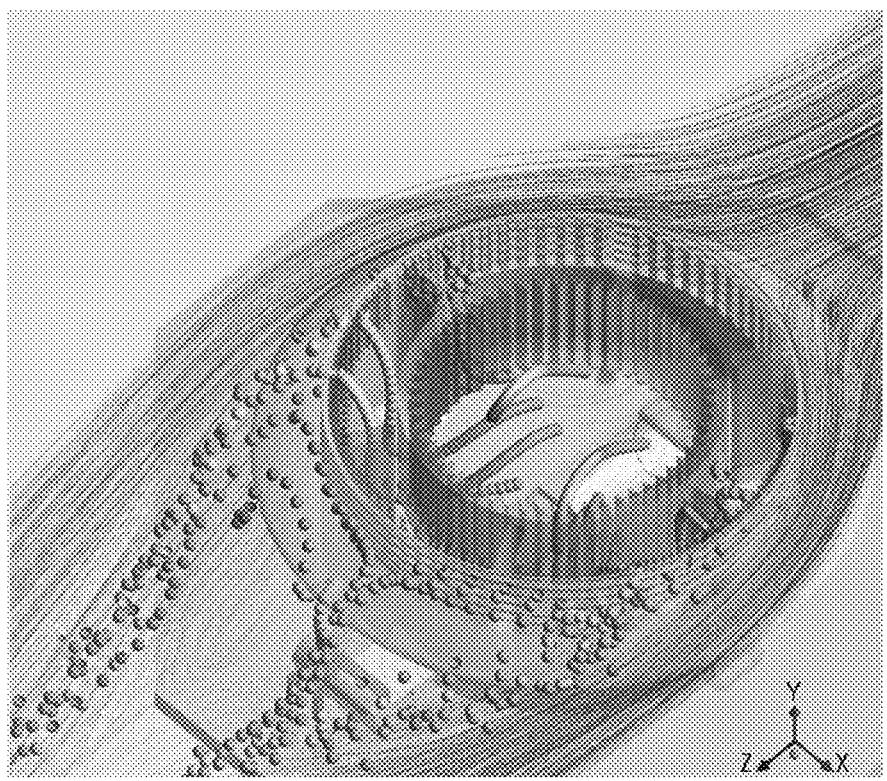

[FIG. 23A]
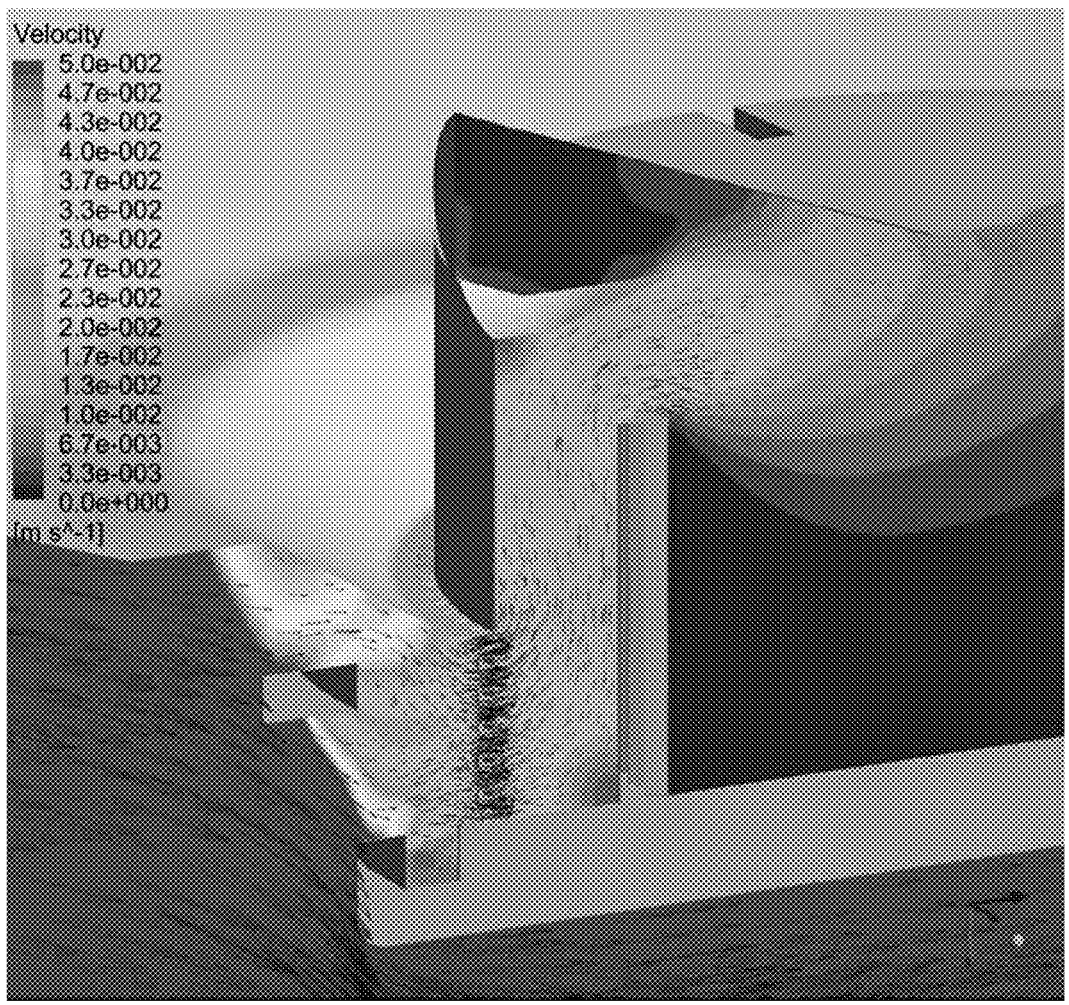

[FIG. 23B]
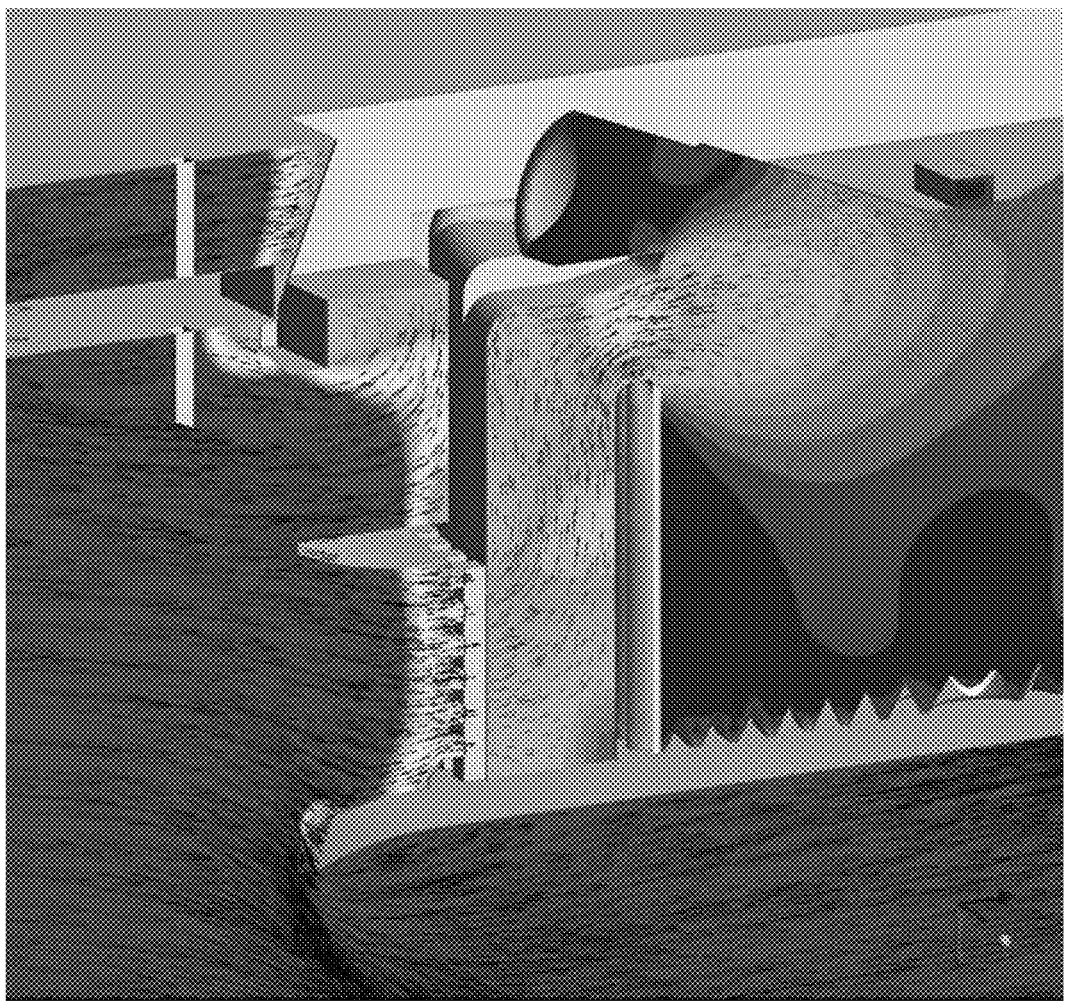

[FIG. 24A]
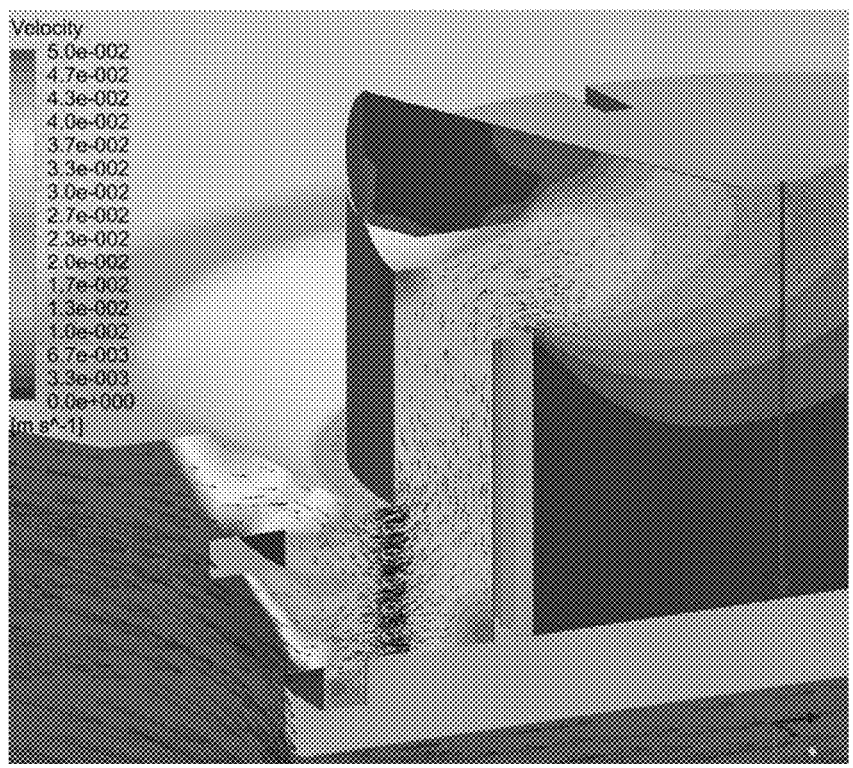

[FIG. 24B]
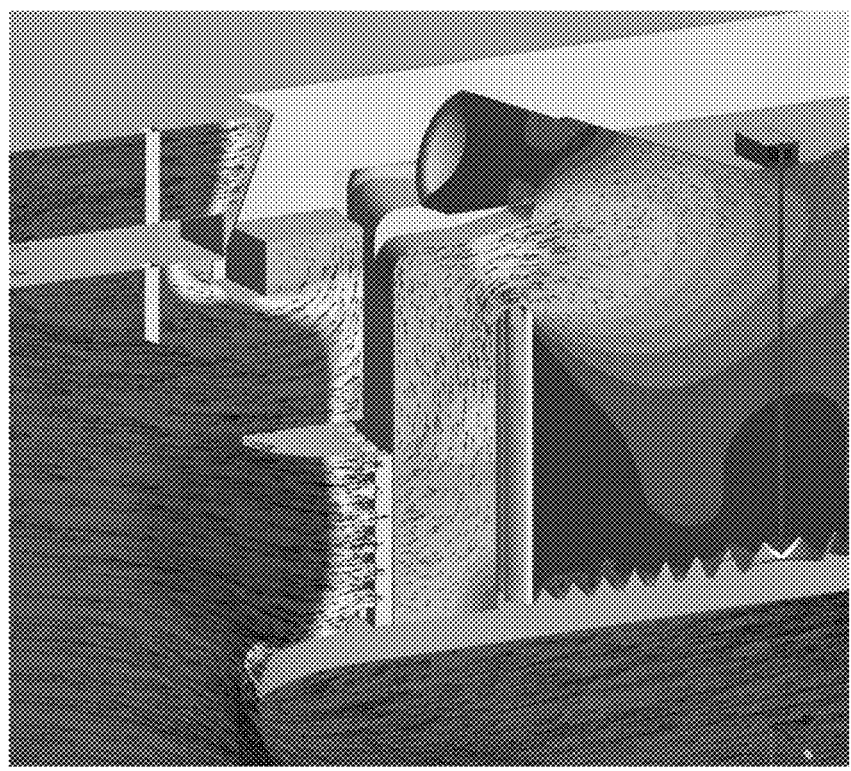

[FIG. 25A]
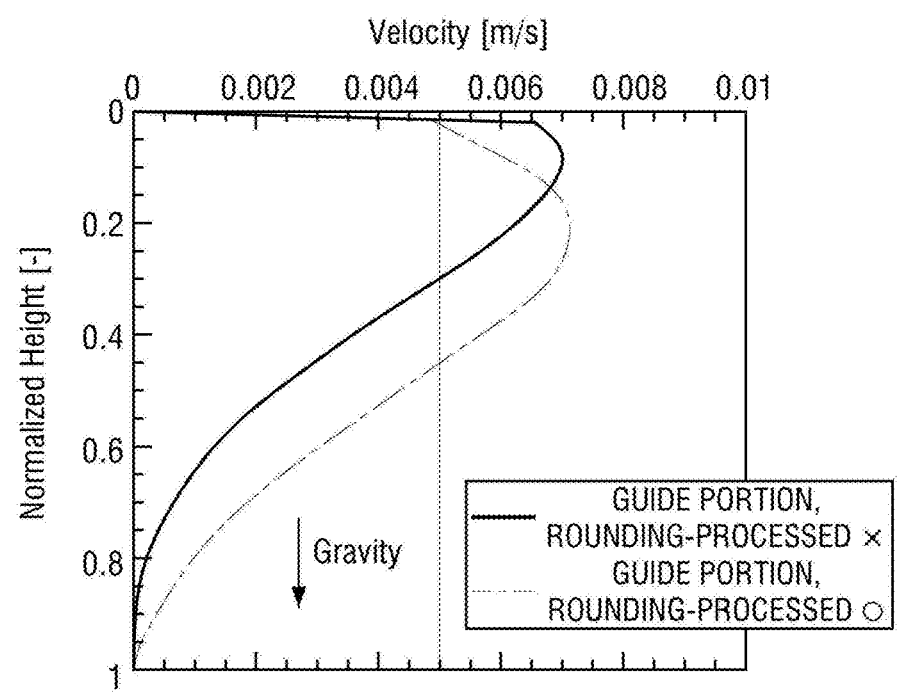

PHOTOELECTRIC SMOKE DETECTOR HAVING DOUBLE-BULKHEAD DARKROOM STRUCTURE

CROSS-REFERENCE TO RELATED APPLICATION

The present application in the U.S. National Phase of PCT/KR16/012967, filed on Nov. 11, 2016, which claims priority to Korean Patent Application No. 10-2016-00123097, filed on Sep. 26, 2016, the entire contents of which are incorporated herein by reference.

BACKGROUND

Technical Field

The present invention relates to a photoelectric smoke detector having a double-bulkhead darkroom structure. More particularly, the present invention relates to a photoelectric smoke detector which includes a darkroom having a double-bulkhead structure so as to increase an inflow rate and a flow velocity.

Description of the Related Art

Smoke type fire detectors are classified into photoelectric smoke detectors and ionization type smoke detectors depending on means for detecting a change in concentration of introduced smoke. The photoelectric smoke detector detects a change in smoke concentration by using a light emitting element, which is a light emitting source, and a light receiving sensor which receives light emitted from the light emitting element. The ionization type detector detects a change in smoke concentration by using a material containing an americium isotope.

Meanwhile, in the event of a fire, the photoelectric smoke detector converts the change in smoke concentration into a predetermined electrical signal and generates an alarm.

FIGS. 1 and 2 are exploded perspective views illustrating a configuration of a photoelectric smoke detector 1 in the related art. As illustrated in FIG. 1, the photoelectric smoke detector 1 in the related art is configured to be electrically connected to a terminal of a base 10 fixed at an attachment position. Further, a light emitting element receiving part 12 in which a light emitting element 11 is mounted is provided at one side of the base 10, and a light receiving element receiving part 14 in which a light receiving element 13 is mounted is provided at the other side of the base 10. In addition, as illustrated in FIG. 1, smoke is introduced through smoke inlet holes 5 formed around an upper portion of a main body 2 mounted on the base 10.

Meanwhile, because the occurrence of a fire is detected based on a change in concentration of smoke introduced into the smoke inlet holes 5 of the main body 2, it is necessary to effectively avoid an inflow of fine dust and small insects that may affect the change in concentration, and it is necessary to sufficiently reduce the amount of light introduced from the smoke inlet holes.

As illustrated in FIG. 2, a fire detector 1 in the related art has a structure in which multiple guide vanes (typically defined as wedge structures) 3 are concentrically formed on an outer circumferential surface of a darkroom installed in the main body 2, and a blocking wall 4 surrounds an outer circumference of the guide vanes 3. In addition, the blocking wall 4 has small holes that allow smoke to be introduced therethrough with no difficulty and prevent the inflow of fine dust and small insects. An upper end of the darkroom in which the blocking wall 4 is installed is closed by a cover.

The purpose of closing the darkroom is to effectively block the light introduced from the outside and to prevent an erroneous operation of the fire detector by sufficiently reducing intensity of the light by allowing the light having straightness to collide with many obstacles even though a small amount of light is introduced.

According to a result of analyzing flow characteristics of a gas flow in the darkroom, there is a problem in that the darkroom having a wedge structure in the related art has asymmetric flow characteristics depending on inflow angles of the gas flow and there occurs a low flow velocity region.

More specifically, in the smoke detector 1 having the wedge structure in the related art, flow characteristics are greatly changed depending on inflow/outflow directions of the gas flow in accordance with an inflow direction angle, and a blocking wall effect of the wedge structure greatly reduces a velocity of the gas flow in the darkroom, and as a result, there is a problem in that the probability of adhesion of particles increases due to an increase in low flow velocity regions.

Therefore, it is necessary to improve the structure of the smoke detector 1 having the wedge structure in the related art, and thus there is a need for development on a smoke detector having an improved structure capable of ensuring uniform flow characteristics in accordance with an inflow angle of a gas flow, increasing a high-concentration particle distribution region at the periphery of a detector, and reducing the probability of deposition of particles.

SUMMARY OF THE INVENTION

Accordingly, the present invention has been made in an effort to solve the above-mentioned problems, and according to the exemplary embodiment of the present invention, an object of the present invention is to provide a photoelectric smoke detector having a double-bulkhead structure which may ensure uniform flow characteristics in accordance with inflow angles of a gas flow, increase a high-concentration particle distribution region at the periphery of the detector, and reduce the probability of deposition of particles.

According to the exemplary embodiment of the present invention, an object of the present invention is to provide a photoelectric smoke detector having a double-bulkhead structure, which has the double bulkheads structure, such that it is possible to increase a high-concentration particle distribution region at the periphery of the detector and to reduce the probability of deposition of particles by ensuring a relatively high velocity of a gas flow in a smoke inflow region, it is possible to minimize a pressure drop when smoke passes through a space between the double bulkheads by increasing a distance between the double bulkheads and having an internal flow guide portion of an outer bulkhead which is inclined upward at a predetermined angle, it is possible to accelerate a gas flow and/or a flow of particles into a darkroom by decreasing a space of a screen of an inlet, and it is possible to maintain a higher gas flow velocity by decreasing a rate of pressure drop by rounding-processing edges of the double bulkheads.

In addition, according to the exemplary embodiment of the present invention, an object of the present invention is to provide a photoelectric smoke detector having a double-bulkhead structure, which has the double bulkheads structure, such that it is possible to obtain a constant detection performance because flow characteristics of an inner gas flow in accordance with an incident direction of a gas flow are less changed, it is possible to minimize an influence of an inflow direction of the gas flow on internal flow characteristics by decreasing a height of a region of a screen of an inlet, forming guide portions protruding outward at upper and lower ends of the inlet, and rounding-processing edges of the double bulkheads in a gas flow region, and it is possible to increase a high-concentration particle distribution region and to reduce the probability of deposition of particles by ensuring a gas flow velocity equal to or higher than a critical velocity at the periphery of the detector.

Meanwhile, technical problems to be solved by the present disclosure are not limited to the above-mentioned technical problems, and other technical problems, which are not mentioned above, may be clearly understood from the following descriptions by those skilled in the art to which the present disclosure pertains.

The objects of the present invention may be achieved by a photoelectric smoke detector having a double-bulkhead structure, the photoelectric smoke detector including: a base which has, at one side thereof, a light emitting element receiving part in which a light emitting element for emitting light into the base is mounted, and has, at the other side thereof, a light receiving element receiving part in which a light receiving element for receiving light, which is emitted by the light emitting element and scattered by smoke particles, is mounted; an outer bulkhead which protrudes downward from the base to define an outer wall of the smoke detector, and has a smoke inlet that is formed in a circumferential direction and has a particular height; a lower end surface which is coupled to a lower end of the outer bulkhead; and an inner bulkhead which protrudes upward from the lower end surface, is disposed to be spaced apart from the outer bulkhead at a particular interval, and has a height smaller than a height of the outer bulkhead to define a gas flow region at an upper side thereof, wherein smoke is introduced through the smoke inlet and introduced through a space between the outer bulkhead and the inner bulkhead, and the gas flow region.

In addition, a longitudinal direction of the inner bulkhead may be a height direction, and the inner bulkhead has multiple protrusion portions which are spaced apart from one another in the circumferential direction at predetermined intervals and protrude outward.

Further, the photoelectric smoke detector may further include an internal flow guide portion connected inward to an upper end surface of the outer bulkhead, in which a planar direction of the internal flow guide portion has an upward angle of 1 to 20° with respect to a surface perpendicular to the longitudinal direction of the outer bulkhead.

In addition, the photoelectric smoke detector may further include a first guide portion which protrudes outward from an upper end of the inlet.

Further, the photoelectric smoke detector may further include a second guide portion which protrudes outward from a lower end of the inlet.

In addition, a lower surface of the first guide portion and an upper surface of the second guide portion may be formed as curved surfaces to guide an inflow of smoke into the inlet.

Further, an edge portion, which is connected to the outer bulkhead and the internal flow guide portion, and an upper end surface of the inner bulkhead may be rounding-processed at a particular curvature.

In addition, a particular space between the outer bulkhead and the inner bulkhead may be 0.3 to 0.6 of a radius of the smoke detector.

Further, a height of the inlet may be 0.3 to 0.5 of a height of the outer bulkhead.

In addition, the inlet may have a screen for preventing an inflow of light, fine dust, and insects.

According to the exemplary embodiment of the present invention, it is possible to ensure uniform flow characteristics in accordance with the inflow angles of the gas flow, increase the high-concentration particle distribution region at the periphery of the detector, and reduce the probability of deposition of particles.

According to the exemplary embodiment of the present invention, since the double bulkheads structure is employed, it is possible to increase the high-concentration particle distribution region at the periphery of the detector and to reduce the probability of deposition of particles by ensuring a relatively high velocity of the gas flow in a smoke inflow region, it is possible to minimize a pressure drop when the smoke passes through the space between the double bulkheads by increasing the distance between the double bulkheads and having the internal flow guide portion of the outer bulkhead which is inclined upward at a predetermined angle, it is possible to accelerate the gas flow and/or the flow of particles into the darkroom by decreasing the space of the screen of the inlet, and it is possible to maintain a higher gas flow velocity by decreasing a rate of pressure drop by rounding-processing the edges of the double bulkheads.

In addition, according to the exemplary embodiment of the present invention, since the double bulkheads structure is employed, it is possible to obtain a constant detection performance because the flow characteristics of the inner gas flow in accordance with the incident direction of the gas flow are less changed, it is possible to minimize the influence of the inflow direction of the gas flow on the internal flow characteristics by decreasing the height of the region of the screen of the inlet, forming the guide portions protruding outward at the upper and lower ends of the inlet, and rounding-processing the edges of the double bulkheads in the gas flow region, and it is possible to increase the high-concentration particle distribution region and to reduce the probability of deposition of particles by ensuring the gas flow velocity equal to or higher than a critical velocity at the periphery of the detector.

Meanwhile, the effects obtained by the present disclosure are not limited to the aforementioned effects, and other effects, which are not mentioned above, will be clearly understood by those skilled in the art from the following description.

BRIEF DESCRIPTION OF THE DRAWINGS

The following drawings attached to the present specification illustrate exemplary embodiments of the present invention and serve to further understand the technical spirit of the present invention together with the detailed description of the present invention, and the present invention should not be interpreted as being limited to the items illustrated in the drawings.

FIG. 1 is an exploded perspective view of a typical photoelectric smoke detector.

FIG. 2 is an exploded perspective view of the photoelectric smoke detector having a wedge structure in the related art.

FIG. 3 is a perspective view of a photoelectric smoke detector having a double-bulkhead structure according to an exemplary embodiment of the present invention when viewed from the top side.

FIG. 4 is a perspective view of the photoelectric smoke detector having the double-bulkhead structure according to the exemplary embodiment of the present invention when viewed from the bottom side.

FIG. 5 is a front view of the photoelectric smoke detector having the double-bulkhead structure according to the exemplary embodiment of the present invention.

FIG. 6 is a cut-away perspective view of the photoelectric smoke detector having the double-bulkhead structure according to the exemplary embodiment of the present invention when viewed from the top side.

FIG. 7 is a cut-away perspective view of the photoelectric smoke detector having the double-bulkhead structure according to the exemplary embodiment of the present invention when viewed from the bottom side.

FIG. 8 is a cross-sectional view of the photoelectric smoke detector having the double-bulkhead structure according to the exemplary embodiment of the present invention.

FIG. 9 is a graph illustrating a comparison of quantitative indexes in accordance with incident angles of a gas flow in the photoelectric smoke detector having the wedge structure in the related art.

FIGS. 10A and 10B are views illustrating low flow velocity regions and high-concentration particle distribution regions according to Case 1 and Case 3 of the photoelectric smoke detector having the wedge structure in the related art.

FIGS. 11A and 11B are views illustrating distributions of average particle tracking time according to Case 1 and Case 3 of the photoelectric smoke detector having the wedge structure in the related art.

FIG. 12 is a graph illustrating a comparison of quantitative indexes in accordance with incident angles of a gas flow in the photoelectric smoke detector having the double-bulkhead structure.

FIGS. 13A and 13B are views illustrating low flow velocity regions and high-concentration particle distribution regions according to Case 1 and Case 3 of the photoelectric smoke detector having the double-bulkhead structure.

FIGS. 14A and 14B are views illustrating distributions of average particle tracking time according to Case 1 and Case 3 of the photoelectric smoke detector having the double-bulkhead structure.

FIG. 15 is a table illustrating standard deviations between the quantitative indexes of the photoelectric smoke detector in the related art and the quantitative indexes of the photoelectric smoke detector having the double-bulkhead structure.

FIG. 16 is a view illustrating particle distributions in inner/outer regions in a darkroom of the photoelectric smoke detector having the double-bulkhead structure.

FIGS. 17A and 17B are views illustrating velocity vectors and contours at a YZ cross section (X=0) in the photoelectric smoke detector having the double-bulkhead structure.

FIG. 18 is a view illustrating a velocity distribution curve with respect to a vertical line in the darkroom having the double-bulkhead structure.

FIG. 19 is a view illustrating velocity vectors and contours at the YZ cross section (X=0) in an internal flow guide portion having a particular angle and in the photoelectric smoke detector having the double-bulkhead structure.

FIG. 20 is a graph illustrating a comparison of quantitative indexes in accordance with incident angles of a gas flow in the photoelectric smoke detector having the guide portion, the double-bulkhead structure, and a rounding-processed edge.

FIGS. 21A and 21B are views illustrating low flow velocity regions and high-concentration particle distribution regions according to Case 1 and Case 3 of the photoelectric smoke detector having the guide portion, the double-bulkhead structure, and the rounding-processed edge.

FIGS. 22A and 22B are views illustrating distributions of average particle tracking time according to Case 1 and Case 3 of the photoelectric smoke detector having the guide portion, the double-bulkhead structure, and the rounding-processed edge.

FIGS. 23A and 23B are views illustrating velocity vectors and contours at the YZ cross section (X=0) in accordance with whether the guide portion and the edge are rounding-processed.

FIGS. 24A and 24B are views illustrating flow improvement points of a main gas flow at the YZ cross section (X=0) in accordance with whether the guide portion and the edge are rounding-processed.

FIG. 25 is a graph illustrating velocity distribution curves with respect to a vertical line in the darkroom in accordance with whether the guide portion and the edge are rounding-processed.

DETAILED DESCRIPTION OF THE EMBODIMENTS

The above-mentioned objects, other objects, features, and advantages of the present invention will be easily understood with reference to the following exemplary embodiments associated with the accompanying drawings. However, the present invention is not limited to the exemplary embodiments to be described below and may be specified as other aspects. On the contrary, the exemplary embodiments introduced herein are provided to make the disclosed content thorough and complete, and sufficiently transfer the spirit of the present invention to the person skilled in the art.

In the present specification, when one constituent element is described as being disposed on another constituent element, one constituent element may be formed directly on another constituent element or a third constituent element may be interposed therebetween Further, in the drawings, a thickness of each constituent element is exaggerated for effective descriptions of technical contents.

The exemplary embodiments disclosed in the present specification will be described with reference to cross-sectional views and/or top plan views which are ideal exemplified views of the present invention. In the drawings, a thickness of each film and a thickness of each region are exaggerated for effective descriptions of technical contents. Therefore, the forms of the exemplified views may be changed depending on manufacturing technologies and/or permissible errors. Therefore, the exemplary embodiments of the present invention are not limited to illustrated specific forms but include the change in forms produced depending on the manufacturing processes. For example, a region, which is illustrated as having a right angle, may be rounded or may have a predetermined curvature. Therefore, the regions illustrated in the drawings have attributes, and the shapes of the regions illustrated in the drawings are intended to exemplify specific forms of the regions of the elements but not to limit the scope of the present invention. The terms "first" and "second" are used to describe the various constituent elements in the various exemplary embodiments of the present specification, but the constituent elements should not be limited by the terms. These terms are merely used to distinguish one constituent elements from the other constituent elements. The exemplary embodiments described and illustrated herein also include complementary exemplary embodiments thereof.

The terms used in the present specification are for explaining the exemplary embodiments, not for limiting the present invention. Unless particularly stated otherwise in the present specification, a singular form also includes a plural form. The term "comprise" and/or "comprising" used in the specification does not exclude existence or addition of one or more other constituent elements in addition to the mentioned constituent element.

To describe the following specific exemplary embodiments, the various particular contents are proposed to more specifically describe the present invention and help understand the present invention. However, those who are knowledgeable in this field enough to understand the present invention may recognize that the present invention may be used without the various particular contents. It is noted that the description of the parts, which are commonly known and are not greatly related to the present invention, will be omitted in some instances in order to avoid unnecessary confusion when describing the present invention.

<Configuration of Photoelectric Smoke Detector Having Double-Bulkhead Structure>

Hereinafter, a configuration of a photoelectric smoke detector 100 having a double-bulkhead structure according to an exemplary embodiment of the present invention will be described.

First, FIG. 3 is a perspective view of the photoelectric smoke detector 100 having the double-bulkhead structure according to the exemplary embodiment of the present invention when viewed from the top side. In addition, FIG. 4 is a perspective view of the photoelectric smoke detector 100 having the double-bulkhead structure according to the exemplary embodiment of the present invention when viewed from the bottom side, and FIG. 5 is a front view of the photoelectric smoke detector 100 having the double-bulkhead structure according to the exemplary embodiment of the present invention.

Further, FIG. 6 is a cut-away perspective view of the photoelectric smoke detector 100 having the double-bulkhead structure according to the exemplary embodiment of the present invention when viewed from the top side. In addition, FIG. 7 is a cut-away perspective view of the photoelectric smoke detector 100 having the double-bulkhead structure according to the exemplary embodiment of the present invention when viewed from the bottom side, and FIG. 8 is a cross-sectional view of the photoelectric smoke detector 100 having the double-bulkhead structure according to the exemplary embodiment of the present invention.

As illustrated in FIGS. 3 to 8, it can be seen that the photoelectric smoke detector 100 having the double-bulkhead structure according to the exemplary embodiment of the present invention may entirely include a base 10, a lower end surface, an outer bulkhead 20, and an inner bulkhead 30.

A light emitting element receiving part 12 and a light receiving element receiving part 14 are formed on an inner surface of the base 10. That is, the light emitting element receiving part 12, in which a light emitting element 11 for emitting light into the base 10 is mounted, is provided at one side of the inner surface of the base 10. In addition, the light receiving element receiving part 14, in which a light receiving element 13 for receiving light, which is emitted by the light emitting element 11 and scattered by smoke particles, is mounted, is provided at the other side of the inner surface of the base 10.

In addition, a darkroom having the double-bulkhead structure is formed by the outer bulkhead 20 and the inner bulkhead 30. As illustrated in FIGS. 3 to 8, it can be seen that the outer bulkhead 20 has a cylindrical shape and protrudes downward from the base 10 to define an outer wall of the smoke detector 100. In addition, a smoke inlet 23 is formed in a circumferential direction at one side of the outer bulkhead 20 so as to have a particular height.

In addition, the lower end surface for closing the interior, as the darkroom, is coupled to a lower end of the outer bulkhead 20.

Further, as illustrated in FIGS. 6 to 8, it can be seen that the inner bulkhead 30 entirely has a cylindrical shape and protrudes upward from the lower end surface, and the inner bulkhead 30 is disposed to be spaced apart from the outer bulkhead 20 at a particular interval, such that a particular space 33 is formed between the outer bulkhead 20 and the inner bulkhead 30. In addition, the inner bulkhead 30 has a height smaller than a height of the outer bulkhead 20, such that a gas flow region 32 is formed at an upper side of the inner bulkhead 30.

Further, as illustrated in FIG. 8, the smoke is introduced through the smoke inlet 23 and flows from a lower side to an upper side in the particular space between the outer bulkhead 20 and the inner bulkhead 30, and then the smoke is introduced into the inner bulkhead 30 through the gas flow region 32.

In addition, as illustrated in FIGS. 5 to 8, the inner bulkhead 30 may be configured to have multiple protrusion portions 31 disposed in the circumferential direction. A longitudinal direction of the protrusion portion 31 is the height direction, and the protrusion portions 31 are formed in the circumferential direction so as to be spaced apart from one another at predetermined intervals and protrude outward.

Further, as illustrated in FIGS. 5 to 8, it can be seen that the smoke detector 100 includes internal flow guide portions 24 which is connected inward to an upper end surface of the outer bulkhead 20. In addition, as illustrated in FIG. 8, a planar direction of the internal flow guide portion 24 has an upward angle of about 1 to 20° with respect to a surface perpendicular to the longitudinal direction of the outer bulkhead 20.

Therefore, since the smoke detector 100 according to the exemplary embodiment of the present invention has the internal flow guide portion 24 having the particular angle, it is possible to minimize a pressure drop when a gas passes through the double-bulkhead structure.

In addition, as illustrated in FIGS. 3 to 8, it can be seen that the smoke detector 100 includes a first guide portion 21 which protrudes outward from an upper end of the inlet 23, and a second guide portion 22 which protrudes outward from a lower end of the inlet 23. Further, a lower surface of the first guide portion 21 and an upper surface of the second guide portion 22 are formed as curved surfaces in order to guide the inflow of the smoke into the inlet 23.

Further, as illustrated in FIG. 8, it can be seen that an edge, which is connected to the outer bulkhead 20 and the internal flow guide portion 24, is rounding-processed at a particular curvature. In addition, the upper end surface of the inner bulkhead 30, that is, an upper end surface of each of the multiple protrusion portions 31 is also rounding-processed at a particular curvature.

Therefore, with this configuration, it is possible to decrease a rate of pressure drop and maintain a high gas flow velocity.

Further, according to the exemplary embodiment of the present invention, the particular space between the outer bulkhead 20 and the inner bulkhead 30 may have a size which is about 0.3 to 0.6 of a radius of the outer bulkhead 20.

In addition, as illustrated in FIGS. 3 to 8, the inlet 23 formed in the outer bulkhead 20 is provided at the lower end of the outer bulkhead 20, and a height of the inlet 23 may be about 0.3 to 0.5 of a height of the outer bulkhead 20. Therefore, since the smoke detector 100 has the first and second guide portions 21 and 22 and the small-sized inlet 23, it is possible to accelerate a gas flow and/or a flow of particles into the darkroom. Further, the inlet 23 has a screen 25 for preventing an inflow of light, fine dust, and insects.

Therefore, since the photoelectric smoke detector 100 according to the exemplary embodiment of the present invention has the above-mentioned structure, it is possible to ensure uniform flow characteristics in accordance with the inflow angles of the gas flow, ensure a high-concentration particle distribution region at the periphery of the detector 100, and reduce the probability of deposition of particles.

That is, since the smoke detector 100 according to the exemplary embodiment of the present invention has the double bulkheads structure, it is possible to increase the high-concentration particle distribution region at the periphery of the detector 100 and to reduce the probability of deposition of particles by ensuring a relatively high velocity of the gas flow in a smoke inflow region, it is possible to minimize a pressure drop when the smoke passes through the space 33 between the double bulkheads by increasing the distance between the double bulkheads and having the internal flow guide portion 24 of the outer bulkhead which is inclined upward at a predetermined angle, it is possible to accelerate the gas flow and/or the flow of particles into the darkroom by decreasing the space of the screen 25 of the inlet 23, and it is possible to maintain a higher gas flow velocity by decreasing a rate of pressure drop by rounding-processing the edges of the double bulkheads.

In addition, since the double bulkheads structure is employed, it is possible to obtain a constant detection performance because the flow characteristics of the inner gas flow in accordance with the incident direction of the gas flow are less changed, it is possible to minimize the influence of the inflow direction of the gas flow on the internal flow characteristics by decreasing the height of the region of the screen 25 of the inlet, forming the guide portions 21 and 22 protruding outward at the upper and lower ends of the inlet 23, and rounding-processing the edges of the double bulkheads in the gas flow region, and it is possible to increase the high-concentration particle distribution region and to reduce the probability of deposition of particles by ensuring the gas flow velocity equal to or higher than a critical velocity at the periphery of the detector 100.

<Analysis Result Data>

Hereinafter, analysis result data associated with the above-mentioned flow characteristics of the gas flow of the smoke detector will be described.

First, there will be described the analysis results obtained through a comparison between the flow characteristics of the gas flow in the smoke detector having the wedge structure in the related art and the flow characteristics of the gas flow in the smoke detector having the double-bulkhead structure and through a comparison of the flow characteristics of the gas flow in accordance with whether the guide portions 21 and 22 and the edges in the double-bulkhead structure are rounding-processed.

[Double-Bulkhead Structure]

FIG. 9 is a graph illustrating a comparison of quantitative indexes in accordance with incident angles of the gas flow in the photoelectric smoke detector having the wedge structure in the related art. In addition, FIGS. 10A and 10B are views illustrating low flow velocity regions and high-concentration particle distribution regions according to Case 1 and Case 3 of the photoelectric smoke detector having the wedge structure in the related art. FIGS. 11A and 11B are views illustrating distributions of average particle tracking time according to Case 1 and Case 3 of the photoelectric smoke detector having the wedge structure in the related art.

The photoelectric smoke detector having the wedge structure in the related art has an asymmetric structure and has the wedge structure installed in the darkroom. FIG. 9 illustrates the quantitative indexes in accordance with the inflow directions of the gas flow, and the deviation in the low flow velocity region is very high in accordance with the inflow directions. Based on the indexes in the low flow velocity regions, a deviation ratio between a maximum value and a minimum value is about 54%. In addition, an average value of the low flow velocity regions, an average value of the high-concentration particle distribution regions, and an average value of the average particle tracking time are 7.59 $cm^3$, 2.03 $cm^3$, and 4.49 seconds, respectively.

To analyze relationships between the darkroom structures of the detectors and the flow characteristics, the quantitative indexes according to Case 1 and Case 3 having the maximum and minimum values of the low flow velocity regions were analyzed through visualization, as illustrated in FIGS. 10A and 10B, and FIGS. 11A and 11B. In Case 1, the gas flow is introduced through a left upper end of the detector and curved by 90 degrees, and then the gas flow is discharged through left and right sides of the detector. This is because a volume in the detector is larger than a volume in the darkroom and the gas flow is disposed between the wedge structures such that the internal flow characteristics are greatly changed in accordance with the directions of the gas flow. In particular, the wedge structure at the lower end of the detector generates a blocking wall effect against the discharged gas flow, thereby promoting the growth of the low flow velocity region.

In contrast, in Case 3, the gas flow passes in a diagonal direction, and only a slight amount of gas is discharged through the left lower end. The gas flow passes relatively more smoothly than the gas flow in Case 1, but the left wedge structure and the detector still block the gas flow, and as a result, the low flow velocity region is greatly grown. Therefore, it is determined that the protruding detector structure and the wedge structure produce an adverse effect in view of the uniform detection performance of the detector.

FIGS. 11A and 11B illustrate distributions of the average particle tracking time inside/outside the detector, and it can be seen that a relatively large number of particles having a retention time of about 10 seconds are distributed in the darkroom according to Case 1. Therefore, in Case 1, the retention time of the particles in the darkroom is relatively long in comparison with Case 3. Consequently, in Case 1, the low flow velocity region is widely distributed, and the retention time of the particles in the darkroom is long, and as a result, it is determined that the probability of deposition of dust particles will be very high.

FIG. 12 is a graph illustrating a comparison of quantitative indexes in accordance with incident angles of the gas flow in the photoelectric smoke detector having the double-bulkhead structure, FIGS. 13A and 13B are views illustrating low flow velocity regions and high-concentration particle distribution regions according to Case 1 and Case 3 of the photoelectric smoke detector having the double-bulkhead structure, and FIGS. 14A and 14B are views illustrating distributions of average particle tracking time according to Case 1 and Case 3 of the photoelectric smoke detector having the double-bulkhead structure.

The photoelectric smoke detector having the double-bulkhead structure has asymmetric inner and outer detector structures and has the double-bulkhead darkroom structure. FIG. 12 illustrates the quantitative indexes in accordance with the inflow directions, and the deviation of the low flow velocity regions is relatively smaller than the deviation of the wedge structure. Based on the indexes in the low flow velocity regions, a deviation ratio between a maximum value and a minimum value is about 16%. In addition, an average value of the low flow velocity regions, an average value of the high-concentration particle distribution regions, and an average value of the average particle tracking time are 3.35 cm$^3$, 0.36 cm$^3$, and 3.23 seconds, respectively.

The quantitative indexes according to Case 1 and Case 3 having the maximum and minimum values of the low flow velocity regions were analyzed through visualization, as illustrated in FIGS. 13A and 13B. In Case 3, a guide blocks an external gas inflow, such that the low flow velocity region is greatly grown between a bulkhead and a detector cover at a rear side of the guide. For this reason, it is determined that the high-concentration particle distribution region including the low flow velocity region between the bulkhead and the detector cover is affected by the inflow direction of the gas flow. In contrast, the tendency of the distribution of the low flow velocity regions in the darkroom past the bulkhead does not greatly vary. This is because the double bulkheads structure decreases an influence of the gas flow, which is introduced from the outside, against the interior of the darkroom. It is determined that the reason is that the direction of the external gas flow is rapidly changed twice and thus the main gas flow is relatively uniformly distributed. The smoke detector having the double-bulkhead structure has a recessed detector structure, and as a result, the gas flow in the darkroom is not greatly affected by the detector.

FIGS. 14A and 14B illustrate the distributions of the average particle tracking time inside/outside the detector, and most of the particles, which are introduced into the darkroom along a particle tracking route, pass over the periphery of the detector. This is because a passageway of the double bulkheads structure forms a flow toward a ceiling surface of the darkroom where the detector is positioned.

FIG. 15 is a table illustrating standard deviations between the quantitative indexes of the photoelectric smoke detector in the related art and the quantitative indexes of the photoelectric smoke detector having the double-bulkhead structure. In addition, FIG. 16 is a view illustrating particle distributions in inner/outer regions in a darkroom of the photoelectric smoke detector having the double-bulkhead structure, and FIGS. 17A and 17B are views illustrating velocity vectors and contours at a YZ cross section (X=0) in the photoelectric smoke detector having the double-bulkhead structure. In addition, FIG. 18 is a view illustrating a velocity distribution curve with respect to a vertical line in the darkroom having the double-bulkhead structure. Further, FIG. 19 is a view illustrating velocity vectors and contours at the YZ cross section (X=0) in an internal flow guide portion 24 having a particular angle and in the photoelectric smoke detector having the double-bulkhead structure.

The standard deviation values of the quantitative indexes were compared to relatively compare degrees of influences of the internal flow characteristics in accordance with the incident directions of the gas flow between the smoke detector having the double-bulkhead structure and the smoke detector having the wedge structure. The influence decreases as the standard deviation decreases. FIG. 15 illustrates the standard deviations of the quantitative indexes of the smoke detector having the double-bulkhead structure and the smoke detector having the wedge structure. According to all of the indexes, the standard deviation value of the smoke detector having the double-bulkhead structure is smaller than the standard deviation values of the remaining models.

This result is coincident with the above-mentioned analysis result obtained by visualizing the quantitative indexes, and consequently, it is determined that the smoke detector having the double-bulkhead structure has a relatively uniform detection performance regardless of the incident angle of the gas flow. Therefore, the relationship between the flow characteristics of the gas flow and the detector structure of the smoke detector having the double-bulkhead structure was analyzed, and additionally, the influence on the detector performance was contemplated.

Referring to FIG. 16, only one of analysis regions was visualized with respect to the YZ planar cross section in order to analyze the entire particle distribution and the flow in the regions inside/outside the darkroom. The detector structure has a recessed shape and is positioned on a ceiling surface (−Y direction). The flow of most particles is shown mainly in a region at the periphery of the detector (region indicated by the red dotted lines—•), and consequently, it is determined that the double-bulkhead structure has a more efficient structure in view of detection by forming the same gas flow regardless of the incident direction of the gas flow.

FIG. 17A illustrates velocity vectors and contours at the YZ cross section (X=0). As illustrated in FIG. 17A, the velocity of the gas flow introduced into the upper end of the darkroom is higher after the gas flow pass the double bulkheads structure. In addition, the velocity is relatively high in the vicinity of the high-concentration particle distribution region. FIG. 17B illustrates an enlarged view of a velocity distribution in the double bulkheads structure at the periphery of a route of a gas inflow in the darkroom. As illustrated in FIG. 17B, there is a contracted structure to the screen 25 past the guide, and a size of a lattice of the screen 25 is larger, such that it is determined that a relatively large amount of gas flow and a relatively larger number of particles may be introduced.

FIG. 18 illustrates a velocity distribution curve with respect to a vertical line in the darkroom (height direction, yellow dotted lines in FIGS. 17A and 17B). Velocities at an uppermost end point and a lowermost end point in the darkroom are shown when normalized heights in the velocity distribution curve are 0 and 1, respectively.

As a result, the wedge structure is a major cause of the occurrence of the asymmetric flow characteristics and the low flow velocity region, and the double bulkheads darkroom structure having the recessed detector structure is less affected by the incident direction of the gas flow. In addition, in order to increase the high-concentration particle distribution region at the periphery of the detector and reduce the probability of deposition of particles, a relatively high-velocity gas flow is essentially required in the corresponding region. Therefore, it is necessary to minimize the pressure drop when the gas flow passes through the double bulkheads structure. To this end, it is necessary to increase the distance between the double bulkheads, and it is necessary to install the internal flow guide portion at an outlet of the bulkhead and design a particular angle toward the upper side, as illustrated in FIG. 19. In addition, the guide-screen space having the contracted structure accelerates the gas flow and the flow of particles into the darkroom, and it is necessary to maintain a higher gas flow velocity by reducing a rate of pressure drop by rounding-processing the edges of the double bulkheads.

[Guide Portion and Rounding-Processing]

Hereinafter, there will be described a result of analyzing the gas flow in accordance with whether the guide portions 21 and 22 and the edges in the double-bulkhead structure are rounding-processed. Hereinafter, the smoke detector in which the guide portions 21 and 22 and the edges are not rounding-processed is called Comparative Example 1, and the smoke detector in which the guide portions 21 and 22 and the edges are rounding-processed is called Comparative Example 2.

FIG. 20 is a graph illustrating a comparison of quantitative indexes in accordance with incident angles of a gas flow in the photoelectric smoke detector having the guide portions 21 and 22, the double-bulkhead structure, and the rounding-processed edge. Further, FIGS. 21A and 21B are views illustrating low flow velocity regions and high-concentration particle distribution regions according to Case 1 and Case 3 of the photoelectric smoke detector having the guide portion, the double-bulkhead structure, and the rounding-processed edge. In addition, FIGS. 22A and 22B are views illustrating distributions of average particle tracking time according to Case 1 and Case 3 of the photoelectric smoke detector having the guide portions 21 and 22, the double-bulkhead structure, and the rounding-processed edge. In addition, FIGS. 23A and 23B are views illustrating velocity vectors and contours at the YZ cross section (X=0) whether the guide portion and the edge are rounding-processed, and FIGS. 24A and 24B are views illustrating flow improvement points of a main gas flow at the YZ cross section (X=0) whether the guide portion and the edge are rounding-processed. Lastly, FIG. 25 is a graph illustrating velocity distribution curves with respect to a vertical line in the darkroom in accordance with whether the guide portions 21 and 22 and the edge are rounding-processed.

Comparative Example 1 and Comparative Example 2 have the darkroom structure symmetric with respect to the Y axis when the detector structure is excluded. FIG. 20 illustrates the quantitative indexes in accordance with the inflow directions of the gas flow, and based on the indexes in the low flow velocity regions, a deviation ratio between the maximum value and the minimum value is about 5%. In addition, an average value of the low flow velocity regions, an average value of the high-concentration particle distribution regions, and an average value of the average particle tracking time are 4.12 cm$^3$, 0.271 cm$^3$, and 3.59 seconds, respectively. FIGS. 21A, 21B, 22A, and 22B illustrate distributions of the quantitative indexes inside/outside the darkroom of the detector according to Comparative Example 2.

To analyze the entire flow characteristics in the regions inside/outside the darkroom, one region (−X) of the analysis regions was visualized with respect to the YZ planar cross section, as illustrated in FIGS. 23A and 23B. In Comparative Example 2, the first and second horizontal guide portions 21 and 22 are installed in a region forward from the screen in the guide-screen space, such that Comparative Example 2 has a structure similar to the contracted structure of Comparative Example 1. Further, the hindrance of the external gas flow is reduced, and as a result, a high gas flow velocity is created to an immediately front end of the screen in comparison with Comparative Example 1. In addition, in Comparative Example 2, the space between the double bulkheads is further increased, such that a high gas flow velocity is maintained to the space 33 between the double bulkheads.

FIGS. 24A and 24B illustrate the flow improvement points of the main gas flow which are made by improving the darkroom structure of the detector. Since the contracted guide-screen space structure and the edges of the double bulkheads are rounding-processed, a relatively high gas flow velocity is created to the interior of the darkroom according to the Comparative Example 2 in comparison with Comparative Example 1. For this reason, as illustrated in FIG. 25, a maximum gas flow velocity at the periphery of a center of the interior of the darkroom (at the periphery of the detector) is higher by about 3% than the maximum gas flow velocity in Comparative Example 1.

As a result, according to Comparative Example 2 corresponding to the exemplary embodiment of the present invention, the influence of the inflow direction of the gas flow on the internal flow characteristics is insignificant, and it is determined that the high-concentration particle distribution region is increased and the probability of deposition of particles is reduced by ensuring a gas flow velocity equal to or higher than a critical velocity at the periphery of the detector.

In addition, the system and the method, which have been described above, are not limited by the configurations and methods of the exemplary embodiments as described above, but the exemplary embodiments may also be configured by selectively combining a whole or part of the exemplary embodiments, such that various modifications can be made.

What is claimed is:

1. A photoelectric smoke detector having a double-bulkhead structure, the photoelectric smoke detector comprising:
a base which has, at one side thereof, a light emitting element receiving part in which a light emitting element for emitting light into the base is mounted, and has, at the other side thereof, a light receiving element receiving part in which a light receiving element for receiving light, which is emitted by the light emitting element and scattered by smoke particles, is mounted;
an outer bulkhead which protrudes downward from the base to define an outer wall of the smoke detector, and has a smoke inlet that is formed in a circumferential direction and has a particular height;
a lower end surface which is coupled to a lower end of the outer bulkhead; and
an inner bulkhead which protrudes upward from the lower end surface, is disposed to be spaced apart from the outer bulkhead at a particular interval, and has a height smaller than a height of the outer bulkhead to define a gas flow region at an upper side thereof,
wherein smoke is introduced through the smoke inlet and introduced through a space between the outer bulkhead and the inner bulkhead, and the gas flow region;
an internal flow guide portion connected inward to an upper end surface of the outer bulkhead;
a first guide portion which protrudes outward from an upper end of the inlet;
a second guide portion which protrudes outward from a lower end of the inlet;
wherein a lower surface of the first guide portion and an upper surface of the second guide portion are formed as curved surfaces to guide an inflow of smoke into the inlet;
wherein an edge portion, which is connected to the outer bulkhead and the internal flow guide portion, and an upper end surface of the inner bulkhead are rounding-processed at a particular curvature;
wherein a particular space between the outer bulkhead and the inner bulkhead is 0.3 to 0.6 of a radius of the smoke detector.

2. The photoelectric smoke detector of claim 1, wherein a longitudinal direction of the inner bulkhead is a height direction, and the inner bulkhead has multiple protrusion portions which are spaced apart from one another in the circumferential direction at predetermined intervals and protrude outward.

3. The photoelectric smoke detector of claim 2, wherein a planar direction of the internal flow guide portion has an upward angle of 1 to 20° with respect to a surface perpendicular to the longitudinal direction of the outer bulkhead.

4. The photoelectric smoke detector of claim 1, wherein a height of the inlet is 0.3 to 0.5 of a height of the outer bulkhead.

5. The photoelectric smoke detector of claim 4, wherein the inlet has a screen for preventing an inflow of light, fine dust, and insects.

\* \* \* \* \*